(12) United States Patent
Powell et al.

(10) Patent No.: US 8,669,013 B2
(45) Date of Patent: Mar. 11, 2014

(54) INTEGRATED HYDROMETHANATION FUEL CELL POWER GENERATION

(75) Inventors: Charles Allen Powell, Maylene, AL (US); Pattabhi K. Raman, Kildeer, IL (US); Earl T. Robinson, Lakeland, FL (US); Avinash Sirdeshpande, Houston, TX (US)

(73) Assignee: Greatpoint Energy, Inc., Cambridge, MA (US)

( * ) Notice: Subject to any disclaimer, the term of this patent is extended or adjusted under 35 U.S.C. 154(b) by 433 days.

(21) Appl. No.: 13/031,486

(22) Filed: Feb. 21, 2011

(65) Prior Publication Data

US 2011/0207002 A1 Aug. 25, 2011

Related U.S. Application Data

(60) Provisional application No. 61/307,226, filed on Feb. 23, 2010.

(51) Int. Cl.
*H01M 8/06* (2006.01)

(52) U.S. Cl.
USPC ........... 429/410; 429/400; 429/408; 429/411; 429/413; 429/415; 48/127.7; 48/61; 423/63

(58) Field of Classification Search
CPC .......... H01M 2008/1293; H01M 8/06; H01M 8/0618; H01M 8/0643; H01M 8/0668; H01M 8/067
USPC ............... 429/400–535; 48/127.7, 61; 423/63
See application file for complete search history.

(56) References Cited

U.S. PATENT DOCUMENTS

| | | | |
|---|---|---|---|
| 2,605,215 | A | 7/1952 | Coghlan |
| 2,694,623 | A | 11/1954 | Welty, Jr., et al. |
| 2,791,549 | A | 5/1957 | Jahnig |
| 2,813,126 | A | 11/1957 | Tierney |
| 2,860,959 | A | 11/1958 | Pettyjohn et al. |
| 2,886,405 | A | 5/1959 | Benson et al. |
| 3,034,848 | A | 5/1962 | King |
| 3,114,930 | A | 12/1963 | Oldham et al. |
| 3,150,716 | A | 9/1964 | Strelzoff et al. |
| 3,164,330 | A | 1/1965 | Neidl |
| 3,351,563 | A | 11/1967 | Negra et al. |
| 3,435,590 | A | 4/1969 | Smith |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

Gerdes, Kristin, et al., "Integrated Gasification Fuel Cell Performance and Cost Assessment," National Energy Technology Laboratory, U.S. Department of Energy, Mar. 27, 2009, pp. 1-26.

(Continued)

*Primary Examiner* — Patrick Ryan
*Assistant Examiner* — Alex Usyatinsky
(74) *Attorney, Agent, or Firm* — McDonnell Boehnen Hulbert & Berghoff LLP

(57) ABSTRACT

The present invention relates to processes and apparatuses for generating electrical power from certain non-gaseous carbonaceous feedstocks through the integration of catalytic hydromethanation technology with fuel cell technology.

15 Claims, 5 Drawing Sheets

(56) References Cited

U.S. PATENT DOCUMENTS

| | | |
|---|---|---|
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A * | 10/1976 | Kalina et al. ............... 48/202 |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,696,678 A | 9/1987 | Koyama et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |

(56) References Cited

U.S. PATENT DOCUMENTS

| | | |
|---|---|---|
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,074,357 A | 12/1991 | Haines |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,225,044 A | 7/1993 | Breu |
| 5,236,557 A | 8/1993 | Muller et al. |
| 5,250,083 A | 10/1993 | Wolfenbarger et al. |
| 5,277,884 A | 1/1994 | Shinnar et al. |
| 5,388,645 A | 2/1995 | Puri et al. |
| 5,388,650 A | 2/1995 | Michael |
| 5,435,940 A | 7/1995 | Doering et al. |
| 5,536,893 A | 7/1996 | Gudmundsson |
| 5,566,755 A | 10/1996 | Seidle et al. |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,669,960 A | 9/1997 | Couche |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,032,737 A | 3/2000 | Brady et al. |
| 6,090,356 A | 7/2000 | Jahnke et al. |
| 6,119,778 A | 9/2000 | Seidle et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,419,888 B1 | 7/2002 | Wyckoff |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,830,597 B1 | 12/2004 | Green |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,077,202 B2 | 7/2006 | Shaw et al. |
| 7,100,692 B2 | 9/2006 | Parsley et al. |
| 7,118,720 B1 | 10/2006 | Mendelsohn et al. |
| 7,132,183 B2 | 11/2006 | Galloway |
| 7,168,488 B2 | 1/2007 | Olsvik et al. |
| 7,205,448 B2 | 4/2007 | Gajda et al. |
| 7,220,502 B2 | 5/2007 | Galloway |
| 7,299,868 B2 | 11/2007 | Zapadinski |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,677,309 B2 | 3/2010 | Shaw et al. |
| 7,758,663 B2 | 7/2010 | Rabovitser et al. |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 8,114,176 B2 | 2/2012 | Nahas |
| 8,114,177 B2 | 2/2012 | Hippo et al. |
| 8,123,827 B2 | 2/2012 | Robinson |
| 8,163,048 B2 | 4/2012 | Rappas et al. |
| 8,192,716 B2 | 6/2012 | Raman et al. |
| 8,202,913 B2 | 6/2012 | Robinson et al. |
| 8,268,899 B2 | 9/2012 | Robinson et al. |
| 8,286,901 B2 | 10/2012 | Rappas et al. |
| 8,297,542 B2 | 10/2012 | Rappas et al. |
| 8,328,890 B2 | 12/2012 | Reiling et al. |
| 8,349,037 B2 | 1/2013 | Steiner et al. |
| 8,349,039 B2 | 1/2013 | Robinson |
| 8,361,428 B2 | 1/2013 | Raman et al. |
| 8,366,795 B2 | 2/2013 | Raman et al. |
| 8,479,833 B2 | 7/2013 | Raman |
| 8,479,834 B2 | 7/2013 | Preston |
| 8,502,007 B2 | 8/2013 | Hippo et al. |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0023086 A1* | 2/2004 | Su et al. .................. 429/17 |
| 2004/0123601 A1 | 7/2004 | Fan |
| 2004/0180971 A1 | 9/2004 | Inoue et al. |
| 2004/0256116 A1 | 12/2004 | Olsvik et al. |
| 2005/0107648 A1 | 5/2005 | Kimura et al. |
| 2005/0137442 A1 | 6/2005 | Gajda et al. |
| 2005/0192362 A1 | 9/2005 | Rodriguez et al. |
| 2005/0287056 A1 | 12/2005 | Baker et al. |
| 2005/0288537 A1 | 12/2005 | Maund et al. |
| 2006/0149423 A1 | 7/2006 | Barnicki et al. |
| 2006/0228290 A1 | 10/2006 | Green |
| 2006/0231252 A1 | 10/2006 | Shaw et al. |
| 2006/0265953 A1 | 11/2006 | Hobbs |
| 2006/0272813 A1 | 12/2006 | Olsvik et al. |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2008/0141591 A1 | 6/2008 | Kohl |
| 2008/0289822 A1 | 11/2008 | Betzer Tsilevich |
| 2009/0012188 A1 | 1/2009 | Rojey et al. |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |

(56) References Cited

U.S. PATENT DOCUMENTS

| | | |
|---|---|---|
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 101555420 | 10/2009 |
| DE | 2 210 891 | 3/1972 |
| DE | 100610607 | 6/2002 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1004746 | 5/2000 |
| EP | 1136542 | 9/2001 |
| EP | 1 207 132 | 5/2002 |
| EP | 1 741 673 | 6/2006 |
| EP | 1768207 | 3/2007 |
| EP | 2058471 | 5/2009 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 03-115491 | 5/1991 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |

(56) References Cited

FOREIGN PATENT DOCUMENTS

| | | |
|---|---|---|
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2010/132549 | 11/2010 |
| WO | WO 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034891 | 3/2011 |
| WO | WO 2011/034890 | 3/2011 |
| WO | 2011/049858 | 4/2011 |
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | WO 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

Ghosh, S., et al., "Energy Analysis of a Cogeneration Plant Using Coal Gasification and Solid Oxide Fuel Cell," Energy, 2006, vol. 31, No. 2-3, pp. 345-363.
Jeon, S.K., et al., "Characteristics of Steam Hydrogasification of Wood Using a Micro-Batch Reactor," Fuel, 2007, vol. 86, pp. 2817-2823.
Li, Mu, et al., "Design of Highly Efficient Coal-Based Integrated Gasification Fuel Cell Power Plants," Journal of Power Sources, 2010, vol. 195, pp. 5707-5718.
Prins, M.J., et al., "Exergetic Optimisation of a Production Process of Fischer-Tropsch Fuels from Biomass," Fuel Processing Technology, 2005, vol. 86, No. 4, pp. 375-389.
U.S. Appl. No. 13/484,918, filed May 31, 2012.
U.S. Appl. No. 13/402,022, filed Feb. 22, 2012.
U.S. Appl. No. 13/450,995, filed Apr. 19, 2012.
A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.
Brown et al., "Biomass-Derived Hydrogen From A thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).
U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and C1 by leaching of straw char, *Biomass and Bioenergy*, vol. 20, pp. 447-457, (2001).
Meyers, et al. Fly Ash as A Construction Material for Highways, A Manual. Federal Highway Administration, Report No. FHWA-IP-76-16, Washington, DC, 1976.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Moulton, Lyle K. "Bottom Ash and Boiler Slag", *Proceedings of the Third International Ash Utilization Symposium*, U.S. Bureau of Mines, Information Circular No. 8640, Washington, DC, 1973.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From A Thermally Ballasted Gasifier," Aug. 2005.
Brown et al., "Biomass-Derived Hydrogen From A Thermally Ballasted Gasifier," DOE Hydrogen Program Contractors' Review Metting, Center for Sustainable Environmental Technologies, Iowa State University, May 21, 2003.
Coal Conversion Processes (Gasification), Encyclopedia of Chemical Technology, $4^{th}$ Edition, vol. 6, pp. 541-566.
Cohen, S.J., Project Manager, "Large Pilot Plant Alternatives for Scaleup of the Catalytic Coal Gasification Process," FE-2480-20, U.S. Dept. of Energy, Contract No., EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept of Energy, Contract No. ET-78-C-01-2777, 1981.

(56) References Cited

OTHER PUBLICATIONS

Kalina, T., Nahas, N. C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.

Nahas, N. C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yaloum Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

Hydromethanation Process, GreatPoint Energy, Inc., from World Wide Web <http://greatpointenergy.com/ourtechnology.php.> accessed Sep. 5, 2013.

Sigma-Aldrich "Particle Size Conversion Table" (2004); from World Wide Web <http:/www.sigmaaldrich.com/chemistry/learning-center/technical-library/particle-size-conversion.printerview.html>.

* cited by examiner

INTEGRATED HYDROMETHANATION FUEL CELL POWER GENERATION

CROSS REFERENCE TO RELATED APPLICATION

This application claims priority under 35 U.S.C. §119 from U.S. Provisional Application Ser. No. 61/307,226 (filed 23 Feb. 2010), the disclosure of which is incorporated by reference herein for all purposes as if fully set forth.

FIELD OF THE INVENTION

The present invention relates to processes and apparatuses for generating electrical power from certain non-gaseous carbonaceous feedstocks through the integration of catalytic hydromethanation technology with fuel cell technology.

BACKGROUND OF THE INVENTION

Fuel cells are receiving considerable attention due to their direct and potentially highly-efficient generation of electrical power through the electrochemical conversion of hydrogen and other fuel sources without direct combustion.

In a typical fuel cell, an oxygen-containing gas (such as air) enters the fuel cell on the cathode side of the cell. At the cathode, oxygen in the air is converted (reduced) to oxide ions, which cross an electrolyte (typically a ceramic membrane) to the anode. On the anode side, the fuel is electrochemically oxidized producing both heat and electrical energy.

In a hydrogen-based fuel cell, for example, hydrogen is oxidized to water (steam). In a hydrocarbon-based fuel cell, the hydrocarbon (such as methane) is oxidized to carbon dioxide and water.

One issue with such fuel cells is that the oxidative reactions are highly exothermic, and the ability (or inability) to efficiently utilize this generated heat is directly related to the overall efficiency of the fuel cell process.

One proposed use of this excess thermal energy involves feeding a mixed hydrogen/methane fuel stream to the fuel cell. The hydrogen oxidation is the preferential reaction, and the heat generated at least partially causes the methane to reform (with steam) to hydrogen and carbon monoxide (which reaction is highly endothermic). The resulting hydrogen (and carbon monoxide) from the reforming reaction can then at least in part be consumed as part of the hydrogen fuel cell conversion.

One problem with the use of methane/hydrogen co-feed streams is that a higher fuel value off gas may be produced (containing significant amounts of methane, hydrogen and carbon monoxide). This off gas may be combusted for heat value (for example, to generate steam and electricity), but this is a relatively inefficient use.

In addition, both hydrogen and methane are value-added gases that have substantial other uses. A suitable feed stream for the fuel cell can be generated through the mixing of separately-generated hydrogen and methane streams, but this is not efficient. Therefore, a need remains for low-cost suitable feed streams for fuel cell use.

In view of numerous factors such as higher energy prices and environmental concerns, the production of value-added gaseous products (such as hydrogen and methane) from lower-fuel-value carbonaceous feedstocks, such as petroleum coke, coal and biomass, is receiving renewed attention. The catalytic gasification (hydromethanation) of such materials in the presence of a catalyst source and steam at elevated temperatures and pressures to produce methane, hydrogen and other value-added gases is disclosed, for example, in U.S. Pat. Nos. 3,828,474, 3,998,607, 4,057,512, 4,092,125, 4,094,650, 4,204,843, 4,468,231, 4,500,323, 4,541,841, 4,551,155, 4,558,027, 4,606,105, 4,617,027, 4,609,456, 5,017,282, 5,055,181, 6,187,465, 6,790,430, 6,894,183, 6,955,695, US2003/0167961A1, US2006/0265953A1, US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1 and GB1599932.

The hydromethanation of a carbon source to methane typically involves four separate reactions:

Steam carbon: $C + H_2O \rightarrow CO + H_2$     (I)

Water-gas shift: $CO + H_2O \rightarrow H_2 + CO_2$     (II)

CO Methanation: $CO + 3H_2 \rightarrow CH_4 + H_2O$     (III)

Hydro-gasification: $2H_2 + C \rightarrow CH_4$     (IV)

In the hydromethanation reaction, the first three reactions (I-III) predominate to result in the following overall reaction:

$2C + 2H_2O \rightarrow CH_4 + CO_2$     (V).

The overall hydromethanation reaction is essentially thermally balanced; however, due to process heat losses and other energy requirements (such as required for evaporation of moisture entering the reactor with the feedstock), some heat must be added to maintain the thermal balance.

The reactions are also essentially syngas (hydrogen and carbon monoxide) balanced (syngas is produced and consumed); therefore, as carbon monoxide and hydrogen are withdrawn with the product gases, carbon monoxide and hydrogen need to be added to the reaction as required to avoid a deficiency.

In order to maintain the net heat of reaction as close to neutral as possible (only slightly exothermic or endothermic), and maintain the syngas balance, a superheated gas stream of steam, carbon monoxide and hydrogen is often fed to the hydromethanation reactor. Frequently, the carbon monoxide and hydrogen streams are recycle streams separated from the product gas, and/or are provided by reforming a portion of the product methane. See, for example, U.S. Pat. Nos. 4,094,650, 6,955,595 and US2007/083072A1.

The result is a "direct" methane-enriched raw product gas stream also containing substantial amounts of hydrogen and carbon monoxide which, after certain initial processing, is a potentially advantageous stream for use as a feed for fuel cells.

This potentially advantageous combination of hydromethanation and fuel cells has been recently recognized in, for example, "Integrated Gasification Fuel Cell Performance and Cost Assessment", DOE/NETL-2009/1361 (Mar. 27, 2009). Two integrated configurations are proposed in that publication—both of which combust the anode output of the fuel cell for additional electrical power generation in a similar manner to that found in many Integrated Combined Cycle Gasification ("IGCC") processes, and both of which utilize a variation of the hydromethanation process where oxygen is fed to a hydromethanation reaction for in situ generating syngas and heat required to keep the hydromethanation process in thermal and syngas balance (removing the need to recycle syngas). The proposed configurations in the publication, however, require significant quantities of gaseous oxygen, which is provided via conventional air separation technologies that are highly inefficient and can result in a significant drag on the overall process efficiency.

Therefore, a need remains for improved integrated hydromethanation fuel cell processes with higher efficiencies, for example, through the reduced use of oxygen in the process.

SUMMARY OF THE INVENTION

In one aspect, the invention provides a process for generating electrical power from a non-gaseous carbonaceous material, the process comprising the steps of:

(a) introducing into a hydromethanation reactor (1) a carbonaceous feedstock derived from the non-gaseous carbonaceous material, (2) a hydromethanation catalyst, and (3) a superheated hydromethanation gas feed stream comprising steam, hydrogen and carbon monoxide;

(b) reacting the carbonaceous feedstock in the hydromethanation reactor in the presence of carbon monoxide, hydrogen, steam and hydromethanation catalyst to produce a methane-enriched raw product;

(c) withdrawing a methane-enriched product stream from the hydromethanation reactor, wherein the methane-enriched raw product stream comprises methane, carbon monoxide, hydrogen, carbon dioxide, hydrogen sulfide, steam and heat energy;

(d) recovering a portion of the heat energy from the methane-enriched raw product stream;

(e) removing a substantial portion of the hydrogen sulfide and, optionally, at least a predominant portion of the carbon dioxide, from the methane-enriched raw product stream to produce a sulfur-depleted raw product stream;

(f) introducing into a fuel cell (1) an oxygen-containing gas stream and (2) a fuel mixture, the fuel cell comprising an anode section and a cathode section separated by an electrolyte section, the oxygen-containing gas stream being introduced into the cathode section and the fuel mixture being introduced into the anode section, the fuel mixture comprising at least methane and hydrogen from the from the sulfur-depleted raw product stream;

(g) electrochemically reacting in the fuel cell oxygen from the oxygen-containing gas stream with the fuel mixture to generate electrical power and heat energy;

(h) withdrawing from the fuel cell (1) an oxygen-depleted cathode exhaust stream and (2) an anode exhaust stream, wherein both the oxygen-depleted cathode exhaust stream and the anode exhaust stream comprise heat energy, and wherein the anode exhaust stream further comprises methane, hydrogen, carbon monoxide, carbon dioxide and steam;

(i) recovering a portion of the heat energy from the anode exhaust stream to produce a cooled anode exhaust stream;

(j) removing at least a substantial portion of the carbon dioxide from the cooled anode exhaust stream to generate a carbon dioxide-depleted anode exhaust stream; and (k) optionally generating carbon monoxide and hydrogen from at least a portion of the methane in the carbon-dioxide depleted anode exhaust stream;

wherein the hydrogen and carbon monoxide in the superheated hydromethanation gas feed stream substantially comprises (1) hydrogen and carbon monoxide from the carbon dioxide-depleted anode exhaust stream, and (2) hydrogen and carbon monoxide generated from methane in the carbon dioxide-depleted anode exhaust stream.

The process in accordance with the present invention is useful, for example, for producing electrical power from various non-gaseous carbonaceous materials without direct combustion of those non-gaseous carbonaceous materials.

In a second aspect, the invention provides an apparatus for generating electrical power from a non-gaseous carbonaceous material, the apparatus comprising:

(1) a hydromethanation reactor configured (a) to receive a carbonaceous feedstock derived from the non-gaseous carbonaceous material, a hydromethanation catalyst and a superheated hydromethanation gas feed stream, the superheated hydromethanation gas feed stream comprising steam, hydrogen and carbon monoxide; (b) to contain a reaction of the carbonaceous feedstock in the presence of carbon monoxide, hydrogen, steam and hydromethanation catalyst that produces a methane-enriched raw product; and (c) to exhaust a methane-enriched raw product stream from the hydromethanation reactor, the methane-enriched raw product stream comprising methane, carbon monoxide, hydrogen, carbon dioxide, hydrogen sulfide, steam and heat energy;

(2) a first heat exchanger unit configured to (a) receive the methane-enriched raw product stream; (b) recover heat energy from the methane-enriched raw product stream; and (c) exhaust a cooled methane-enriched raw product stream;

(3) a first acid gas removal unit configured to (a) remove at least a substantial portion of the hydrogen sulfide and, optionally, at least a predominant portion of the carbon dioxide, present in methane-enriched raw product stream to produce a sulfur-depleted raw product stream; and (b) exhaust the sulfur-depleted raw product stream;

(4) a fuel cell comprising an anode section and a cathode section separated by an electrolyte section, the fuel cell configured to (a) receive an oxygen-containing gas stream into the cathode section; (b) receive a fuel mixture into the anode section, the fuel mixture comprising hydrogen and methane from the sulfur-depleted raw product stream; (c) contain the electrochemical reaction of oxygen from the oxygen-containing gas stream with the fuel mixture to generate electrical power and heat energy; (d) exhaust an oxygen-depleted cathode exhaust stream from the cathode section; and (e) exhaust a anode exhaust stream from the anode section; wherein both the oxygen-depleted cathode exhaust stream and the anode exhaust stream comprise heat energy, and wherein the anode exhaust stream further comprises methane, hydrogen, carbon monoxide, carbon dioxide and steam;

(5) a second heat exchanger unit configured to (a) receive the anode exhaust stream; (b) recover heat energy from the anode exhaust stream; and (c) exhaust a cooled anode exhaust stream;

(6) a second acid gas removal unit configured to (a) remove at least a substantial portion of the carbon dioxide present in cooled anode exhaust stream to produce a carbon dioxide-depleted anode exhaust stream; and (b) exhaust the carbon dioxide-depleted anode exhaust stream;

(7) a syngas recycle loop for providing carbon monoxide and hydrogen from the carbon dioxide-depleted anode exhaust stream and, optionally, hydrogen and carbon monoxide generated from methane in the carbon dioxide-depleted anode exhaust stream, to generate the superheated hydromethanation gas feed stream.

These and other embodiments, features and advantages of the present invention will be more readily understood by those of ordinary skill in the art from a reading of the following detailed description.

DETAILED DESCRIPTION

Figure 1:
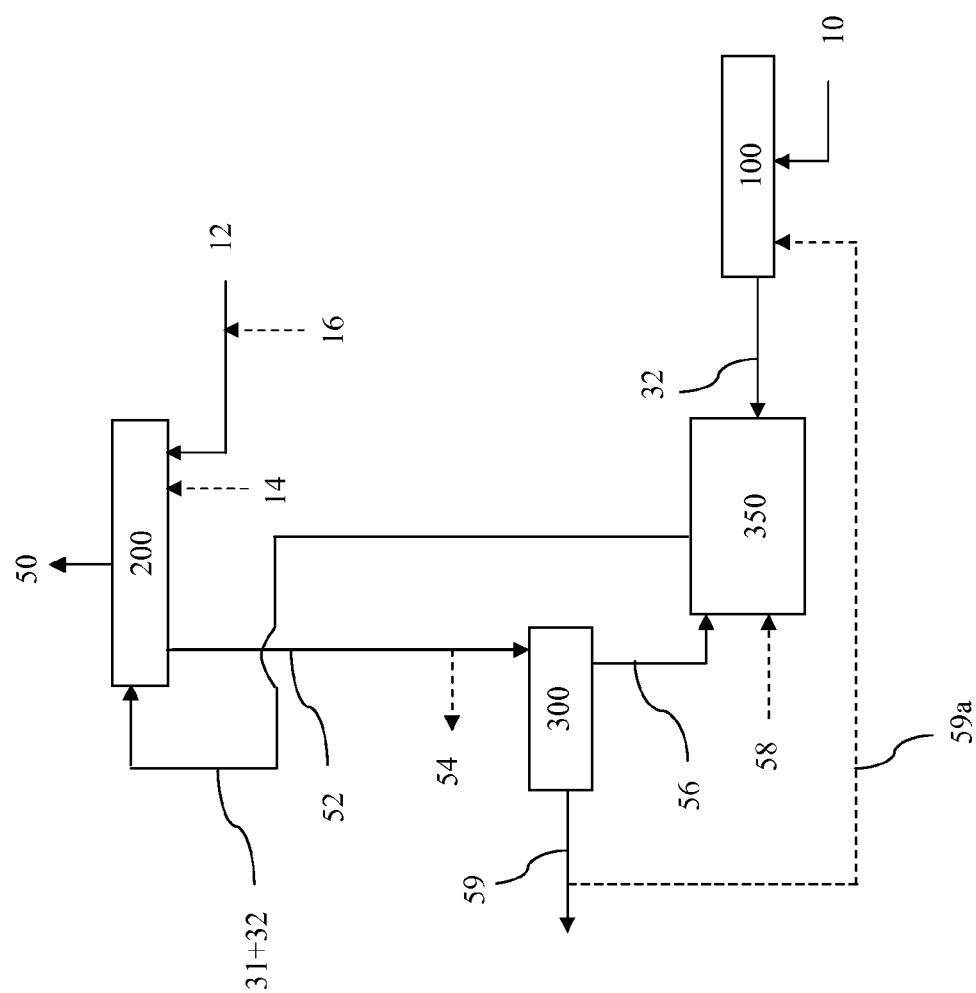
FIG. 1 is a diagram of an embodiment of the hydromethanation portion of a process in accordance with the present invention whereby a methane-enriched raw product stream is produced.

The present invention relates to processes for converting a non-gaseous carbonaceous material ultimately into electrical power through integrated hydromethanation and electrochemical processes. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

Unless stated otherwise, pressures expressed in psi units are gauge, and pressures expressed in kPa units are absolute.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial portion", as used herein, unless otherwise defined herein, means that greater than about 90% of the referenced material, preferably greater than about 95% of the referenced material, and more preferably greater than about 97% of the referenced material. The percent is on a molar basis when reference is made to a molecule (such as methane, carbon dioxide, carbon monoxide and hydrogen sulfide), and otherwise is on a weight basis.

The term "predominant portion", as used herein, unless otherwise defined herein, means that greater than about 50% of the referenced material. The percent is on a molar basis when reference is made to a molecule (such as hydrogen, methane, carbon dioxide, carbon monoxide and hydrogen sulfide), and otherwise is on a weight basis.

The term "depleted" is synonymous with reduced. For example, removing a substantial portion of a material from a stream would produce a material-depleted stream that is substantially depleted of that material.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see US2009/0217575A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., *Miscanthus x giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

The terms "petroleum coke" and "petcoke" as used here include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil (such as a liquid petroleum residue), which petcoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight); it also typically has a very low water soaking capacity to allow for conventional catalyst impregnation methods. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "asphaltene" as used herein is an aromatic carbonaceous solid at room temperature, and can be derived, for example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A material such as methane can be biomass or non-biomass under the above definitions depending on its source of origin.

A "non-gaseous" material is substantially a liquid, semi-solid, solid or mixture at ambient conditions. For example, coal, petcoke, asphaltene and liquid petroleum residue are non-gaseous materials, while methane and natural gas are gaseous materials.

The term "unit" refers to a unit operation. When more than one "unit" is described as being present, those units are operated in a parallel fashion. A single "unit", however, may comprise more than one of the units in series, or in parallel, depending on the context. For example, an acid gas removal unit may comprise a hydrogen sulfide removal unit followed in series by a carbon dioxide removal unit. As another example, a contaminant removal unit may comprise a first removal unit for a first contaminant followed in series by a second removal unit for a second contaminant. As yet another example, a compressor may comprise a first compressor to compress a stream to a first pressure, followed in series by a second compressor to further compress the stream to a second (higher) pressure.

The term "syngas demand" refers to the maintenance of syngas balance in the hydromethanation reactor. As indicated above, in the overall desirable steady-state hydromethanation reaction (see equations (I), (II) and (III) above), hydrogen and carbon monoxide are generated and consumed in relative balance. Because both hydrogen and carbon monoxide are withdrawn as part of the gaseous products, hydrogen and carbon monoxide must be added to (and/or optionally separately generated in situ via a combustion/oxidation reaction with supplied oxygen as discussed below) the hydromethanation reactor in an amount at least required to substantially maintain this reaction balance. For the purposes of the present invention, the amount of hydrogen and carbon monoxide that must be added for the hydromethanation reaction is the "syngas demand".

The term "steam demand" refers to the amount of steam that must be added to the hydromethanation reactor. Steam is consumed in the hydromethanation reaction and some steam must be added to the hydromethanation reactor. The theoretical consumption of steam is two moles for every two moles of carbon in the feed to produce one mole of methane and one mole of carbon dioxide (see equation (V)). In actual practice, the steam consumption is not perfectly efficient and steam is withdrawn with the product gases; therefore, a greater than theoretical amount of steam needs to be added to the hydromethanation reactor, which added amount is the "steam demand". Steam can be added, for example, via steam in the hydromethanation gas feed stream and as a separate steam stream. The amount of steam to be added (and the source) is discussed in further detail below. Steam generated in situ from vaporization of any moisture content of the carbonaceous feedstock can assist in satisfying the steam demand; however, it should be noted that any steam generated in situ or fed into the hydromethanation reactor at a temperature lower than the hydromethanation reaction temperature will have an impact on the "heat demand" for the hydromethanation reaction.

The term "heat demand" refers to the amount of heat energy that must be added to the hydromethanation reactor to keep the reaction of step (b) in substantial thermal balance, as discussed above and as further detailed below.

The materials, methods, and examples herein are illustrative only and, except as specifically stated, are not intended to be limiting.

General Process Information

In one embodiment of the invention, electrical power (90) is ultimately generated from a non-gaseous carbonaceous material (10) as illustrated in FIGS. 1-5, involving the integration of hydromethanation and fuel cell processes.

In accordance with the invention, a non-gaseous carbonaceous material (10) is processed in a feedstock preparation unit (100) to generate a carbonaceous feedstock (32) which is fed to a hydromethanation reactor (200) along with a hydromethanation catalyst (31) and a superheated hydromethanation feed gas stream (12). The superheated hydromethanation feed gas stream (12) may be a single feed stream which comprises, or multiple feed streams which in combination comprise, hydrogen, carbon monoxide, steam and heat energy as required to at least substantially satisfy, or at least satisfy, the syngas, steam and heat demands of the hydromethanation reaction that takes place in hydromethanation reactor (200).

In the hydromethanation reactor (200), the carbonaceous feedstock, steam, hydrogen and carbon monoxide react in the presence of the hydromethanation catalyst to generate a methane-enriched raw product, which is withdrawn as a methane-enriched raw product stream (50) from the hydromethanation reactor (200). The withdrawn methane-enriched raw product stream (50) typically comprises methane, carbon monoxide, carbon dioxide, hydrogen, hydrogen sulfide, steam and heat energy.

The reaction will also typically generate a char by-product, which is withdrawn from hydromethanation reactor (200) as char by-product stream (52). The char by-product may be processed for catalyst recovery and recycle as discussed in further detail below.

A portion of the heat energy is recovered from the methane-enriched raw product stream (50) in a first heat exchanger unit (140) to generate a cooled methane-enriched raw product stream (60), which is then subject to one or more processing steps to generate a fuel mixture (76) for feeding to an anode section (732) of a fuel cell (730) as discussed in further detail below.

One of the pre-fuel cell processing steps is an acid gas removal step (in a first acid gas removal unit (400)) to remove at least a substantial portion of the sulfur content (predominantly in the form of hydrogen sulfide) from cooled methane-enriched raw product stream (60) (or an intermediate processed stream, see below) to generate a sulfur-depleted raw product stream (73). Optionally, at least a predominant portion (or a substantial portion) of the carbon dioxide content may also be removed.

Between the first heat exchanger unit (140) and the first acid gas removal unit (400), the cooled methane-enriched raw product stream (60) may optionally be treated in one or more other processing units, for example, a contaminant removal unit (700), a first sour shift unit (710) and/or a first dehydration unit (720), as discussed in further detail below.

Fuel mixture (76) comprises at least methane and hydrogen from sulfur-depleted raw product stream (73), and typically comprises steam as well. If needed, steam stream (84) may be added to the sulfur-depleted raw product stream (73) for added steam. Fuel mixture (76) is fed to the anode section (732) of fuel cell (730).

Optionally, a portion of the sulfur-depleted raw product stream (73) may also be withdrawn for separate processing as synthesis gas product stream (83), for example, to recover methane and/or hydrogen content as by-product streams, and/or to combust for electrical power and/or steam.

Fuel cell (730) generally comprises the anode section (732) as well as a cathode section (734) separated from the anode section (732) by an electrolyte (735) such as a solid oxide ceramic membrane (a solid oxide fuel cell).

An oxidant, typically an oxygen-containing gas stream such as air stream (92), is fed into the cathode section (734). In the cathode section (734), oxygen is reduced to oxide ions which flow across the electrolyte to the anode section (732). An oxygen-depleted cathode exhaust stream (94) results which is exhausted from the cathode section (734).

The oxide ions enter the anode section (732) and electrochemically oxidize components of fuel mixture (76) to generate heat and electrical current (90) (due to the potential difference between anode section (732) and cathode section (734)). Typically, at least a predominant portion of hydrogen in fuel mixture (76) is oxidized to water (steam), and some of the methane may be oxidized to water (steam) and carbon dioxide. At least a predominant portion of any carbon monoxide that may be present in fuel mixture (76) will also oxidize to carbon dioxide. In addition, the heat generated will cause a portion of the methane in fuel mixture (76) to reform (for example, with steam) into hydrogen and carbon monoxide, a portion of which will oxidize as described above. Methane may also partially oxidize to hydrogen, carbon monoxide, carbon dioxide and water (steam), in which case the hydrogen and carbon monoxide may further oxidize as described above.

An anode exhaust stream (95) is exhausted from the anode section (732), the anode exhaust stream (95) typically comprising heat energy, water (steam) and carbon dioxide reaction products, and unreacted hydrogen, carbon monoxide and methane. Optionally, a portion of anode exhaust stream (95) may be recycled back to the cathode section (732) via anode exhaust recycle stream (95a), for example, to preheat fuel mixture (76).

A portion of the heat energy is recovered from the anode exhaust stream (95) in a second heat exchanger unit (145) to generate a cooled anode exhaust stream (96), which is then subject to one or more processing steps to ultimately generate the superheated hydromethanation gas feed stream (12) that is fed to hydromethanation reactor (200).

One of the post-fuel cell processing steps is an acid gas removal step (in a second acid gas removal unit (410)) to remove at least a substantial portion of the carbon dioxide content from the cooled anode exhaust stream (96) to generate a carbon dioxide-depleted anode exhaust stream (12*a*).

Between the second heat exchange unit (145) and the second acid gas removal unit (410), the cooled anode exhaust stream (96) may optionally be treated in one or more other processing units, for example, a second sour shift unit (715) and/or a second dehydration unit (725) as discussed in further detail below.

The carbon dioxide-depleted anode exhaust stream (12*a*) is recycled in whole or in part, and may also be optionally be treated in one or more processing units, to ultimately result in superheated hydromethanation gas feed stream (12). For example, depending on the composition of carbon dioxide-depleted anode exhaust stream (12*a*), a portion may be separated out (for example, via hydrogen separation unit (750)) as a by-product (for example, hydrogen product stream (75)). Carbon dioxide-depleted anode exhaust stream (12*a*) may alternatively or in addition be passed through a methane reformer unit (760), such as a partial oxidation reactor, to reform methane content to additional hydrogen and carbon monoxide content, as well as to optionally generate heat energy to superheat the superheated hydromethanation gas feed stream (12). Additionally, the steam and heat content of superheated hydromethanation gas feed stream (12) can optionally be supplemented by addition of a superheated steam stream (16).

Additional details and embodiments are provided below.

Hydromethanation

Catalytic gasification/hydromethanation processes and conditions are disclosed, for example, in U.S. Pat. Nos. 3,828,474, 3,998,607, 4,057,512, 4,092,125, 4,094,650, 4,204,843, 4,468,231, 4,500,323, 4,541,841, 4,551,155, 4,558,027, 4,606,105, 4,617,027, 4,609,456, 5,017,282, 5,055,181, 6,187,465, 6,790,430, 6,894,183, 6,955,695, US2003/0167961A1 and US2006/0265953A1, as well as in commonly owned US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1, US2010/0121125A1, US2010/0120926A1, US2010/0071262A1, US2010/0179232A1, US2010/0168495A1, US2010/0168494A1, US2010/0287836A1; U.S. patent application Ser. No. 12/851,864 (entitled PROCESS FOR HYDROMETHANATION OF A CARBONACEOUS FEEDSTOCK), which was filed 6 Aug. 2010; U.S. patent application Ser. Nos. 12/882,415 (entitled PROCESS FOR HYDROMETHANATION OF A CARBONACEOUS FEEDSTOCK), Ser. No. 12/882,412 (entitled INTEGRATED HYDROMETHANATION COMBINED CYCLE PROCESS) and Ser. No. 12/882,417 (entitled PROCESS FOR HYDROMETHANATION OF A CARBONACEOUS FEEDSTOCK), each of which was filed 15 Sep. 2010; U.S. patent application Ser. Nos. 12/906,552 (entitled INTEGRATED ENHANCED OIL RECOVERY PROCESS) and Ser. No. 12/906,547 (entitled INTEGRATED ENHANCED OIL RECOVERY PROCESS), each of which was filed 18 Oct. 2010; and U.S. patent application Ser. Nos. 12/970,105 (entitled INTEGRATED ENHANCED OIL RECOVERY PROCESS) and Ser. No. 12/970,111 (entitled INTEGRATED ENHANCED OIL RECOVERY PROCESS), each of which was filed 16 Dec. 2010.

An example of a suitable hydromethanation portion of a process in accordance with the present invention is illustrated in FIG. 1.

A carbonaceous feedstock (32), hydromethanation catalyst (31) and superheated hydromethanation feed gas stream (12) are introduced into hydromethanation reactor (200). Optionally, an amount of an oxygen-rich gas stream (14) may also be introduced into hydromethanation reactor for process control purposes, as discussed below. Additional steam may also optionally be introduced into hydromethanation reactor (200), for example, directly (not depicted) or via superheated steam stream (16) and superheated hydromethanation feed gas stream (12).

Step (b) occurs within hydromethanation reactor (200).

Any of several types of gasification reactors can be utilized for hydromethanation reactor (200). Suitable reactors include those having a reaction chamber which is a counter-current fixed bed, a co-current fixed bed, a fluidized bed, or an entrained flow or moving bed reaction chamber.

Hydromethanation reactor (200) is typically a fluidized-bed reactor. Hydromethanation reactor (200) can, for example, be a "flow down" countercurrent configuration, where the carbonaceous feedstock (32) is introduced at a higher point so that the particles flow down the fluidized bed to a char by-product collection zone, and the gases flow in an upward direction and are removed at a point above the fluidized bed. Alternatively, hydromethanation reactor (200) can be a "flow up" co-current configuration, where the carbonaceous feedstock (32) is fed at a lower point so that the particles flow up the fluidized bed, along with the gases, to a char by-product collection zone). Typically, in a "flow up" configuration, there will also be a collection zone at the bottom of the reactor for larger particles (including char) that are not fluidized.

Hydromethanation reactor (200) is typically operated at moderately high pressures and temperatures, requiring introduction of the appropriate carbonaceous feedstock to a reaction chamber of the reactor while maintaining the required temperature, pressure and flow rate of the feedstock. Those skilled in the art are familiar with feed inlets to supply the carbonaceous feedstock into the reaction chambers having high pressure and/or temperature environments, including star feeders, screw feeders, rotary pistons and lock-hoppers. It should be understood that the feed inlets can include two or more pressure-balanced elements, such as lock hoppers, which would be used alternately. In some instances, the carbonaceous feedstock can be prepared at pressure conditions above the operating pressure of the reactor and, hence, the particulate composition can be directly passed into the reactor without further pressurization. Gas for pressurization can be an inert gas such as nitrogen, or more typically a stream of carbon dioxide that can, for example be recycled from a carbon dioxide stream generated by an acid gas removal unit.

Hydromethanation reactor (200) is desirably operated at a moderate temperature of at least about 700° F. (about 371° C.), or of at least about 800° F. (about 427° C.), or of at least about 900° F. (about 482° C.), to about 1500° F. (about 816° C.), or to about 1400° F. (about 760° C.), or to about 1300° F. (704° C.); and a pressures of about 250 psig (about 1825 kPa, absolute), or about 400 psig (about 2860 kPa), or about 450 psig (about 3204 kPa), or about 500 psig (about 3549 kPa), to about 800 psig (about 5617 kPa), or to about 700 psig (about 4928 kPa), or to about 600 psig (about 4238 kPa).

Typical gas flow velocities in hydromethanation reactor (200) are from about 0.5 ft/sec (about 0.15 m/sec), or from about 1 ft/sec (about 0.3 m/sec), to about 2.0 ft/sec (about 0.6 m/sec), or to about 1.5 ft/sec (about 0.45 m/sec).

When an oxygen-rich gas stream (14) is also fed into hydromethanation reactor (200), a portion of the carbon content from the carbonaceous feedstock can also be consumed in an oxidation/combustion reaction, generating supplemental heat energy as well as supplemental carbon monoxide and hydrogen. The variation of the amount of oxygen supplied to hydromethanation reactor (200) provides an advantageous process control. Increasing the amount of oxygen will increase the oxidation/combustion, and therefore increase in situ heat and syngas generation. Decreasing the amount of oxygen will conversely decrease the in situ heat and syngas generation.

The amount of oxygen introduced into hydromethanation reactor (200), if any, under steady-state operating conditions will only be for supplemental purposes, as opposed to primary syngas/heat generation purposes as disclosed in previously incorporated DOE/NETL-2009/1361, although higher amounts of oxygen feed may be used for startup/shutdown/maintenance operations.

The hydromethanation and optional oxidation/combustion reactions may occur contemporaneously. Depending on the configuration of hydromethanation reactor (200), the two steps may occur within the same area in the reactor, or may predominant in one zone. When provided, the oxygen-rich gas stream (14) is typically introduced at a point below the fluidized bed zone of hydromethanation reactor (200) in order to avoid formation of hot spots in the reactor, and to avoid combustion of the gaseous products. The oxygen-rich gas stream (14) can, for example, advantageously be introduced into an area of hydromethanation reactor (200) where by-product char is collected, typically in the bottom of the reactor, so that carbon in the by-product char is preferentially consumed as opposed to carbon in a more active hydromethanation zone. For example, when the oxygen-rich gas stream (14) is fed into an area of hydromethanation reactor (200) where char by-product collects, such as below an active hydromethanation fluidized bed zone, the hydromethanation reaction will predominate in the hydromethanation fluidized bed zone, and a partial oxidation/combustion reaction will predominate in the char by-product collection area.

When utilized, the oxygen-rich gas stream (14) can be fed into hydromethanation reactor (200) by any suitable means such as direct injection of purified oxygen, oxygen-air mixtures, oxygen-steam mixtures, or oxygen-inert gas mixtures into the reactor. See, for instance, U.S. Pat. No. 4,315,753 and Chiaramonte et al., Hydrocarbon Processing, September 1982, pp. 255-257.

The oxygen-rich gas stream (14) is typically generated via standard air-separation technologies, and may be fed as a high-purity oxygen stream (about 95% or greater volume percent oxygen, dry basis). Typically, however, the oxygen-rich gas stream will be provided as a mixture with steam, and introduced at a temperature of from about 400° F. (about 204° C.), or from about 450° F. (about 232° C.), or from about 500° F. (about 260° C.), to about 750° F. (about 399° C.), or to about 700° F. (about 371° C.), or to about 650° F. (about 343° C.), and at a pressure at least slightly higher than present in hydromethanation reactor (200).

As indicated above, the hydromethanation reaction has a steam demand, a heat demand and a syngas demand. These conditions in combination are important factors in determining the operating conditions for the hydromethanation reaction as well as the remainder of the process.

For example, the steam demand of the hydromethanation reaction requires a molar ratio of steam to carbon (in the feedstock) of at least about 1. Typically, however, the molar ratio is greater than about 1, or from about 1.5 (or greater), to about 6 (or less), or to about 5 (or less), or to about 4 (or less), or to about 3 (or less), or to about 2 (or less). The moisture content of the carbonaceous feedstock (32), and steam included in the superheated hydromethanation gas feed stream (12) (and oxygen-rich gas stream (14), if present), will determine if additional steam needs to be added (for example, via superheated steam stream (16)) to hydromethanation reactor (200).

As also indicated above, the hydromethanation reaction is essentially thermally balanced but, due to process heat losses and other energy requirements (for example, vaporization of moisture on the feedstock), some heat must be supplied to the hydromethanation reaction to maintain the thermal balance (the heat demand). The addition of the superheated hydromethanation feed gas stream (12), plus the optional partial combustion/oxidation of carbon (from the carbonaceous feedstock) in the presence of the oxygen introduced into hydromethanation reactor (200) from oxygen-rich gas stream (14) (if present), should be sufficient to substantially satisfy both the heat and syngas demand of the hydromethanation reaction.

The gas utilized in hydromethanation reactor (200) for pressurization and reaction of the carbonaceous feedstock (32) comprises the superheated hydromethanation feed gas stream (12) and, optionally, additional steam, nitrogen, air, or inert gases such as argon, which can be supplied to hydromethanation reactor (200) according to methods known to those skilled in the art (such as discussed above for oxygen-rich gas stream (14)). As a consequence, the superheated hydromethanation feed gas stream (12) must be provided at a higher pressure which allows it to enter hydromethanation reactor (200).

The temperature in hydromethanation reactor (200) can be controlled, for example, by controlling the amount and temperature of the superheated hydromethanation feed gas stream (12), as well as the amount of optional oxygen or separately-supplied superheated steam (as discussed above), supplied to hydromethanation reactor (200).

Advantageously, steam for the hydromethanation reaction is generated from other process operations through process heat capture (such as generated in a waste heat boiler, generally referred to as "process steam" or "process-generated steam") and, in some embodiments, is solely supplied as process-generated steam. For example, process steam streams (such as (87)) generated by a heat exchanger unit or waste heat boiler (such as, for example, first heat exchanger unit (140)) can be fed to hydromethanation reactor (200) as superheated steam stream (16).

In certain embodiments, the overall process described herein is at least substantially steam neutral, such that steam demand (pressure and amount) for the hydromethanation reaction can be satisfied via heat exchange with process heat at the different stages therein, or steam positive, such that excess steam is produced and can be used, for example, for power generation. Desirably, process-generated steam accounts for greater than about 95 wt %, or greater than about 97 wt %, or greater than about 99 wt %, or about 100 wt % or greater, of the steam demand of the hydromethanation reaction.

The result of the hydromethanation reaction is a methane-enriched raw product, which is withdrawn from hydromethanation reactor (200) as methane-enriched raw product stream (50) typically comprising $CH_4$, $CO_2$, $H_2$, CO, $H_2S$, unreacted steam, entrained fines and, optionally, other contaminants such as $NH_3$, COS, HCN and/or elemental mercury vapor, depending on the nature of the carbonaceous material utilized for hydromethanation.

If the hydromethanation reaction is run in syngas balance, the methane-enriched raw product stream (50), upon exiting the hydromethanation reactor (200), will typically comprise at least about 20 mol %, or at least about 25 mol %, or at least about 27 mol %, methane based on the moles of methane, carbon dioxide, carbon monoxide and hydrogen in the methane-enriched raw product stream (50). In addition, the methane-enriched raw product stream (50) will typically comprise at least about 50 mol % methane plus carbon dioxide, based on the moles of methane, carbon dioxide, carbon monoxide and hydrogen in the methane-enriched raw product stream (50).

If the superheated hydromethanation feed gas stream (12) contains an excess of carbon monoxide and/or hydrogen above and beyond the syngas demand, or if excess carbon monoxide and/or hydrogen is generated due to the feeding of oxygen-rich gas stream (14) to hydromethanation reactor (200), then there may be some dilution effect on the molar percent of methane and carbon dioxide in methane-enriched raw product stream (50).

The non-gaseous carbonaceous materials (10) useful in these processes include, for example, a wide variety of biomass and non-biomass materials. The carbonaceous feedstock (32) is derived from one or more non-gaseous carbonaceous materials (10), which are processed in a feedstock preparation section (100) as discussed below.

The hydromethanation catalyst (31) can comprise one or more catalyst species, as discussed below.

The carbonaceous feedstock (32) and the hydromethanation catalyst (31) can be intimately mixed (i.e., to provide a catalyzed carbonaceous feedstock (31+32)) before provision to the hydromethanation reactor (200).

Preparation of Carbonaceous Feedstocks for Hydromethanation

Carbonaceous Materials Processing (100)

Carbonaceous materials, such as biomass and non-biomass, can be prepared via crushing and/or grinding, either separately or together, according to any methods known in the art, such as impact crushing and wet or dry grinding to yield one or more carbonaceous particulates. Depending on the method utilized for crushing and/or grinding of the carbonaceous material sources, the resulting carbonaceous particulates may be sized (i.e., separated according to size) to provide the carbonaceous feedstock (32) for use in catalyst loading processes (350) to form a catalyzed carbonaceous feedstock (31+32) for the hydromethanation reactor (200).

Any method known to those skilled in the art can be used to size the particulates. For example, sizing can be performed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the carbonaceous particulates. Classification equipment can include ore sorters, gas cyclones, hydrocyclones, rake classifiers, rotating trommels or fluidized classifiers. The carbonaceous materials can be also sized or classified prior to grinding and/or crushing.

The carbonaceous particulate can be supplied as a fine particulate having an average particle size of from about 25 microns, or from about 45 microns, up to about 2500 microns, or up to about 500 microns. One skilled in the art can readily determine the appropriate particle size for the carbonaceous particulates. For example, when a fluidized bed reactor is used, such carbonaceous particulates can have an average particle size which enables incipient fluidization of the carbonaceous materials at the gas velocity used in the fluidized bed reactor. Desirable particle size ranges for the hydromethanation reactor (200) are in the Geldart A and Geldart B ranges (including overlap between the two), depending on fluidization conditions, typically with limited amounts of fine (below about 25 microns) and coarse (greater than about 250 microns) material.

Additionally, certain carbonaceous materials, for example, corn stover and switchgrass, and industrial wastes, such as saw dust, either may not be amenable to crushing or grinding operations, or may not be suitable for use as such, for example due to ultra fine particle sizes. Such materials may be formed into pellets or briquettes of a suitable size for crushing or for direct use in, for example, a fluidized bed reactor. Generally, pellets can be prepared by compaction of one or more carbonaceous material; see for example, previously incorporated US2009/0218424A1. In other examples, a biomass material and a coal can be formed into briquettes as described in U.S. Pat. Nos. 4,249,471, 4,152,119 and 4,225,457. Such pellets or briquettes can be used interchangeably with the preceding carbonaceous particulates in the following discussions.

Additional feedstock processing steps may be necessary depending on the qualities of carbonaceous material sources. Biomass may contain high moisture contents, such as green plants and grasses, and may require drying prior to crushing. Municipal wastes and sewages also may contain high moisture contents which may be reduced, for example, by use of a press or roll mill (e.g., U.S. Pat. No. 4,436,028). Likewise, non-biomass, such as high-moisture coal, can require drying prior to crushing. Some caking coals can require partial oxidation to simplify operation. Non-biomass feedstocks deficient in ion-exchange sites, such as anthracites or petroleum cokes, can be pre-treated to create additional ion-exchange sites to facilitate catalyst loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Oxidative pre-treatment can be accomplished using any oxidant known to the art.

The ratio and types of the carbonaceous materials in the carbonaceous particulates can be selected based on technical considerations, processing economics, availability, and proximity of the non-biomass and biomass sources. The availability and proximity of the sources for the carbonaceous materials can affect the price of the feeds, and thus the overall production costs of the catalytic gasification process. For example, the biomass and the non-biomass materials can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

Significantly, the carbonaceous material sources, as well as the ratio of the individual components of the carbonaceous particulates, for example, a biomass particulate and a non-biomass particulate, can be used to control other material characteristics of the carbonaceous particulates. Non-biomass materials, such as coals, and certain biomass materials, such as rice hulls, typically include significant quantities of inorganic matter including calcium, alumina and silica which form inorganic oxides (i.e., ash) in the catalytic gasifier. At temperatures above about 500° C. to about 600° C., potassium and other alkali metals can react with the alumina and silica in ash to form insoluble alkali aluminosilicates. In this form, the alkali metal is substantially water-insoluble and inactive as a catalyst. To prevent buildup of the residue in the hydromethanation reactor (200), a solid purge of by-product char (52) comprising ash, unreacted carbonaceous material, and various other compounds (such as alkali metal compounds, both water soluble and water insoluble) can be routinely withdrawn.

In preparing the carbonaceous particulates, the ash content of the various carbonaceous materials can be selected to be, for example, about 20 wt % or less, or about 15 wt % or less, or about 10 wt % or less, or about 5 wt % or less, depending on, for example, the ratio of the various carbonaceous materials and/or the starting ash in the various carbonaceous materials. In other embodiments, the resulting the carbonaceous particulates can comprise an ash content ranging from about 5 wt %, or from about 10 wt %, to about 20 wt %, or to about 15 wt %, based on the weight of the carbonaceous particulate. In other embodiments, the ash content of the carbonaceous particulate can comprise less than about 20 wt %, or less than about 15 wt %, or less than about 10 wt %, or less than about 8 wt %, or less than about 6 wt % alumina, based on the weight of the ash. In certain embodiments, the carbonaceous particulates can comprise an ash content of less than about 20 wt %, based on the weight of processed feedstock where the ash content of the carbonaceous particulate comprises less than about 20 wt % alumina, or less than about 15 wt % alumina, based on the weight of the ash.

Such lower alumina values in the carbonaceous particulates allow for, ultimately, decreased losses of catalysts, and particularly alkali metal catalysts, in the hydromethanation portion of the process. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall process.

Additionally, the resulting carbonaceous particulates can have a significantly higher % carbon, and thus btu/lb value and methane product per unit weight of the carbonaceous particulate. In certain embodiments, the resulting carbonaceous particulates can have a carbon content ranging from about 75 wt %, or from about 80 wt %, or from about 85 wt %, or from about 90 wt %, up to about 95 wt %, based on the combined weight of the non-biomass and biomass.

In one example, a non-biomass and/or biomass is wet ground and sized (e.g., to a particle size distribution of from about 25 to about 2500 µm) and then drained of its free water (i.e., dewatered) to a wet cake consistency. Examples of suitable methods for the wet grinding, sizing, and dewatering are known to those skilled in the art; for example, see previously incorporated US2009/0048476A1. The filter cakes of the non-biomass and/or biomass particulates formed by the wet grinding in accordance with one embodiment of the present disclosure can have a moisture content ranging from about 40% to about 60%, or from about 40% to about 55%, or below 50%. It will be appreciated by one of ordinary skill in the art that the moisture content of dewatered wet ground carbonaceous materials depends on the particular type of carbonaceous materials, the particle size distribution, and the particular dewatering equipment used. Such filter cakes can be thermally treated, as described herein, to produce one or more reduced moisture carbonaceous particulates.

Each of the one or more carbonaceous particulates can have a unique composition, as described above. For example, two carbonaceous particulates can be utilized, where a first carbonaceous particulate comprises one or more biomass materials and the second carbonaceous particulate comprises one or more non-biomass materials. Alternatively, a single carbonaceous particulate comprising one or more carbonaceous materials utilized.

Catalyst Loading for Hydromethanation (350)

The hydromethanation catalyst is potentially active for catalyzing at least reactions (I), (II) and (III) described above. Such catalysts are in a general sense well known to those of ordinary skill in the relevant art and may include, for example, alkali metals, alkaline earth metals and transition metals, and compounds and complexes thereof. Typically, the hydromethanation catalyst is an alkali metal, such as disclosed in many of the previously incorporated references.

For the hydromethanation reaction, the one or more carbonaceous particulates are typically further processed to associate at least one hydromethanation catalyst, typically comprising a source of at least one alkali metal, to generate a catalyzed carbonaceous feedstock (31+32).

The carbonaceous particulate provided for catalyst loading can be either treated to form a catalyzed carbonaceous feedstock (31+32) which is passed to the hydromethanation reactor (200), or split into one or more processing streams, where at least one of the processing streams is associated with a hydromethanation catalyst to form at least one catalyst-treated feedstock stream. The remaining processing streams can be, for example, treated to associate a second component therewith. Additionally, the catalyst-treated feedstock stream can be treated a second time to associate a second component therewith. The second component can be, for example, a second hydromethanation catalyst, a co-catalyst, or other additive.

In one example, the primary hydromethanation catalyst can be provided to the single carbonaceous particulate (e.g., a potassium and/or sodium source), followed by a separate treatment to provide one or more co-catalysts and additives (e.g., a calcium source) to the same single carbonaceous particulate to yield the catalyzed carbonaceous feedstock (31+32). For example, see previously incorporated US2009/0217590A1 and US2009/0217586A1.

The hydromethanation catalyst and second component can also be provided as a mixture in a single treatment to the single second carbonaceous particulate to yield the catalyzed carbonaceous feedstock (31+32).

When one or more carbonaceous particulates are provided for catalyst loading, then at least one of the carbonaceous particulates is associated with a hydromethanation catalyst to form at least one catalyst-treated feedstock stream. Further, any of the carbonaceous particulates can be split into one or more processing streams as detailed above for association of a second or further component therewith. The resulting streams can be blended in any combination to provide the catalyzed carbonaceous feedstock (31+32), provided at least one catalyst-treated feedstock stream is utilized to form the catalyzed feedstock stream.

In one embodiment, at least one carbonaceous particulate is associated with a hydromethanation catalyst and optionally, a second component. In another embodiment, each carbonaceous particulate is associated with a hydromethanation catalyst and optionally, a second component.

Any methods known to those skilled in the art can be used to associate one or more hydromethanation catalysts with any of the carbonaceous particulates and/or processing streams. Such methods include but are not limited to, admixing with a solid catalyst source and impregnating the catalyst onto the processed carbonaceous material. Several impregnation methods known to those skilled in the art can be employed to incorporate the hydromethanation catalysts. These methods include but are not limited to, incipient wetness impregnation, evaporative impregnation, vacuum impregnation, dip impregnation, ion exchanging, and combinations of these methods.

In one embodiment, an alkali metal hydromethanation catalyst can be impregnated into one or more of the carbonaceous particulates and/or processing streams by slurrying with a solution (e.g., aqueous) of the catalyst in a loading tank. When slurried with a solution of the catalyst and/or co-catalyst, the resulting slurry can be dewatered to provide a catalyst-treated feedstock stream, again typically, as a wet cake. The catalyst solution can be prepared from any catalyst source in the present processes, including fresh or make-up catalyst and recycled catalyst or catalyst solution. Methods for dewatering the slurry to provide a wet cake of the catalyst-treated feedstock stream include filtration (gravity or vacuum), centrifugation, and a fluid press.

In another embodiment, as disclosed in previously incorporated US2010/0168495A1, the carbonaceous particulates are combined with an aqueous catalyst solution to generate a substantially non-draining wet cake, then mixed under elevated temperature conditions and finally dried to an appropriate moisture level.

One particular method suitable for combining a coal particulate and/or a processing stream comprising coal with a hydromethanation catalyst to provide a catalyst-treated feedstock stream is via ion exchange as described in previously incorporated US2009/0048476A1 and US2010/0168494A1. Catalyst loading by ion exchange mechanism can be maximized based on adsorption isotherms specifically developed for the coal, as discussed in the incorporated reference. Such loading provides a catalyst-treated feedstock stream as a wet cake. Additional catalyst retained on the ion-exchanged particulate wet cake, including inside the pores, can be controlled so that the total catalyst target value can be obtained in a controlled manner. The total amount of catalyst loaded can be controlled by controlling the concentration of catalyst components in the solution, as well as the contact time, temperature and method, as disclosed in the aforementioned incorporated references, and as can otherwise be readily determined by those of ordinary skill in the relevant art based on the characteristics of the starting coal.

In another example, one of the carbonaceous particulates and/or processing streams can be treated with the hydromethanation catalyst and a second processing stream can be treated with a second component (see previously incorporated US2007/0000177A1).

The carbonaceous particulates, processing streams, and/or catalyst-treated feedstock streams resulting from the preceding can be blended in any combination to provide the catalyzed second carbonaceous feedstock, provided at least one catalyst-treated feedstock stream is utilized to form the catalyzed carbonaceous feedstock (31+32). Ultimately, the catalyzed carbonaceous feedstock (31+32) is passed onto the hydromethanation reactor(s) (200).

Generally, each catalyst loading unit comprises at least one loading tank to contact one or more of the carbonaceous particulates and/or processing streams with a solution comprising at least one hydromethanation catalyst, to form one or more catalyst-treated feedstock streams. Alternatively, the catalytic component may be blended as a solid particulate into one or more carbonaceous particulates and/or processing streams to form one or more catalyst-treated feedstock streams.

Typically, when the hydromethanation catalyst is an alkali metal, it is present in the catalyzed carbonaceous feedstock in an amount sufficient to provide a ratio of alkali metal atoms to carbon atoms in the particulate composition ranging from about 0.01, or from about 0.02, or from about 0.03, or from about 0.04, to about 0.10, or to about 0.08, or to about 0.07, or to about 0.06.

With some feedstocks, the alkali metal component may also be provided within the catalyzed carbonaceous feedstock to achieve an alkali metal content of from about 3 to about 10 times more than the combined ash content of the carbonaceous material in the catalyzed carbonaceous feedstock, on a mass basis.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Optional co-catalysts or other catalyst additives may be utilized, such as those disclosed in the previously incorporated references.

The one or more catalyst-treated feedstock streams that are combined to form the catalyzed carbonaceous feedstock typically comprise greater than about 50%, greater than about 70%, or greater than about 85%, or greater than about 90% of the total amount of the loaded catalyst associated with the catalyzed carbonaceous feedstock (31+32). The percentage of total loaded catalyst that is associated with the various catalyst-treated feedstock streams can be determined according to methods known to those skilled in the art.

Separate carbonaceous particulates, catalyst-treated feedstock streams, and processing streams can be blended appropriately to control, for example, the total catalyst loading or other qualities of the catalyzed carbonaceous feedstock (31+32), as discussed previously. The appropriate ratios of the various stream that are combined will depend on the qualities of the carbonaceous materials comprising each as well as the desired properties of the catalyzed carbonaceous feedstock (31+32). For example, a biomass particulate stream and a catalyzed non-biomass particulate stream can be combined in such a ratio to yield a catalyzed carbonaceous feedstock (31+32) having a predetermined ash content, as discussed previously.

Any of the preceding catalyst-treated feedstock streams, processing streams, and processed feedstock streams, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting catalyzed carbonaceous feedstock (31+32) can be stored for future use or transferred to one or more feed operations for introduction into the hydromethanation reactor(s). The catalyzed carbonaceous feedstock can be conveyed to storage or feed operations according to any methods known to those skilled in the art, for example, a screw conveyer or pneumatic transport.

Further, excess moisture can be removed from the catalyzed carbonaceous feedstock (31+32). For example, the catalyzed carbonaceous feedstock (31+32) may be dried with a fluid bed slurry drier (i.e., treatment with superheated steam to vaporize the liquid), or the solution thermally evaporated or removed under a vacuum, or under a flow of an inert gas, to provide a catalyzed carbonaceous feedstock having a residual moisture content, for example, of about 10 wt % or less, or of about 8 wt % or less, or about 6 wt % or less, or about 5 wt % or less, or about 4 wt % or less. In such a case, steam generated from process heat recovery is desirably utilized.

Catalyst Recovery (300)

Reaction of the catalyzed carbonaceous feedstock (31+32) under the described conditions generally provides the methane-enriched raw product stream (50) and a solid char by-product (52) from the hydromethanation reactor (200). The solid char by-product (52) typically comprises quantities of unreacted carbon, inorganic ash and entrained catalyst. The solid char by-product (52) can be removed from the hydromethanation reactor (200) for sampling, purging, and/or catalyst recovery via a char outlet.

The term "entrained catalyst" as used herein means chemical compounds comprising the catalytically active portion of the hydromethanation catalyst, such as an alkali metal component. For example, "entrained catalyst" can include, but is not limited to, soluble alkali metal compounds (such as alkali carbonates, alkali hydroxides, and alkali oxides) and/or insoluble alkali compounds (such as alkali aluminosilicates). The nature of catalyst components associated with the char extracted from a catalytic gasifier and methods for their recovery are discussed in detail in previously incorporated US2007/0277437A1, US2009/0165383A1, US2009/0165382A1, US2009/0169449A1 and US2009/0169448A1.

The solid char by-product (52) can be periodically withdrawn from the hydromethanation reactor (200) through a char outlet which is a lock hopper system, although other methods are known to those skilled in the art. Methods for removing solid char product are well known to those skilled in the art. One such method taught by EP-A-0102828, for example, can be employed.

The char by-product (52) from the hydromethanation reactor (200) may be passed to a catalytic recovery unit (300), as described below. Such char by-product (52) may also be split into multiple streams, one of which may be passed to a catalyst recovery unit (300), and another stream (54) which may be used, for example, as a methanation catalyst (as described in previously incorporated US2010/0121125A1) and not treated for catalyst recovery.

In certain embodiments, when the hydromethanation catalyst is an alkali metal, the alkali metal in the solid char by-product (52) can be recovered to produce a catalyst recycle stream (56), and any unrecovered catalyst can be compensated by a catalyst make-up stream (58) (see, for example, previously incorporated US2009/0165384A1). The more alumina plus silica that is in the feedstock, the more costly it is to obtain a higher alkali metal recovery.

In one embodiment, the solid char by-product (52) from the hydromethanation reactor (200) can be quenched with a recycle gas and water to extract a portion of the entrained catalyst. The recovered catalyst (56) can be directed to the catalyst loading unit (350) for reuse of the alkali metal catalyst. The depleted char (59) can, for example, be directed to any one or more of the feedstock preparation operations (100) via recycle line (59a) for reuse in preparation of the catalyzed feedstock, combusted to power one or more steam generators (such as disclosed in previously incorporated US2009/0165376A1)), or used as such in a variety of applications, for example, as an absorbent (such as disclosed in previously incorporated US2009/0217582A1).

Other particularly useful recovery and recycling processes are described in U.S. Pat. No. 4,459,138, as well as previously incorporated US2007/0277437A1 US2009/0165383A1, US2009/0165382A1, US2009/0169449A1 and US2009/0169448A1. Reference can be had to those documents for further process details.

The recycle of catalyst can be to one or a combination of catalyst loading processes. For example, all of the recycled catalyst can be supplied to one catalyst loading process, while another process utilizes only makeup catalyst. The levels of recycled versus makeup catalyst can also be controlled on an individual basis among catalyst loading processes.

Gas Processing Prior to Fuel Cell (730)

Fines Removal

The hot gas effluent leaving the reaction chamber of hydromethanation reactor (200) can pass through a fines remover unit (not pictured), incorporated into and/or external of hydromethanation reactor (200), which serves as a disengagement zone. Particles too heavy to be entrained by the gas leaving hydromethanation reactor (200) (i.e., fines) are returned to the reaction chamber (e.g., fluidized bed).

Residual entrained fines may be substantially removed, when necessary, by any suitable device such as internal and/or external cyclone separators optionally followed by Venturi scrubbers. The recovered fines can be processed to recover alkali metal catalyst, or directly recycled back to feedstock preparation as described in previously incorporated US2009/0217589A1.

Removal of a "substantial portion" of fines means that an amount of fines is removed from the resulting gas stream such that downstream processing is not adversely affected; thus, at least a substantial portion of fines should be removed. Some minor level of ultrafine material may remain in the resulting gas stream to the extent that downstream processing is not significantly adversely affected. Typically, at least about 90 wt %, or at least about 95 wt %, or at least about 98 wt %, of the fines of a particle size greater than about 20 µm, or greater than about 10 µm, or greater than about 5 µm, are removed.

First Heat Exchanger Unit (140)

Depending on the hydromethanation conditions, the methane-enriched raw product stream (50) exiting hydromethanation reactor (200) can be generated having at a temperature ranging from about 800° F. (about 427° C.) to about 1500° F. (about 816° C.), and more typically from about 1100° F. (about 593° C.) to about 1400° F. (about 760° C.); a pressure of from about 50 psig (about 446 kPa) to about 800 psig (about 5617 kPa), more typically from about 400 psig (about 2860 kPa) to about 600 psig (about 4238 kPa); and a velocity of from about 0.5 ft/sec (about 0.15 m/sec) to about 2.0 ft/sec (about 0.61 m/sec), more typically from about 1.0 ft/sec (0.30 m/sec) to about 1.5 ft/sec (about 0.46 m/sec).

Figure 2:
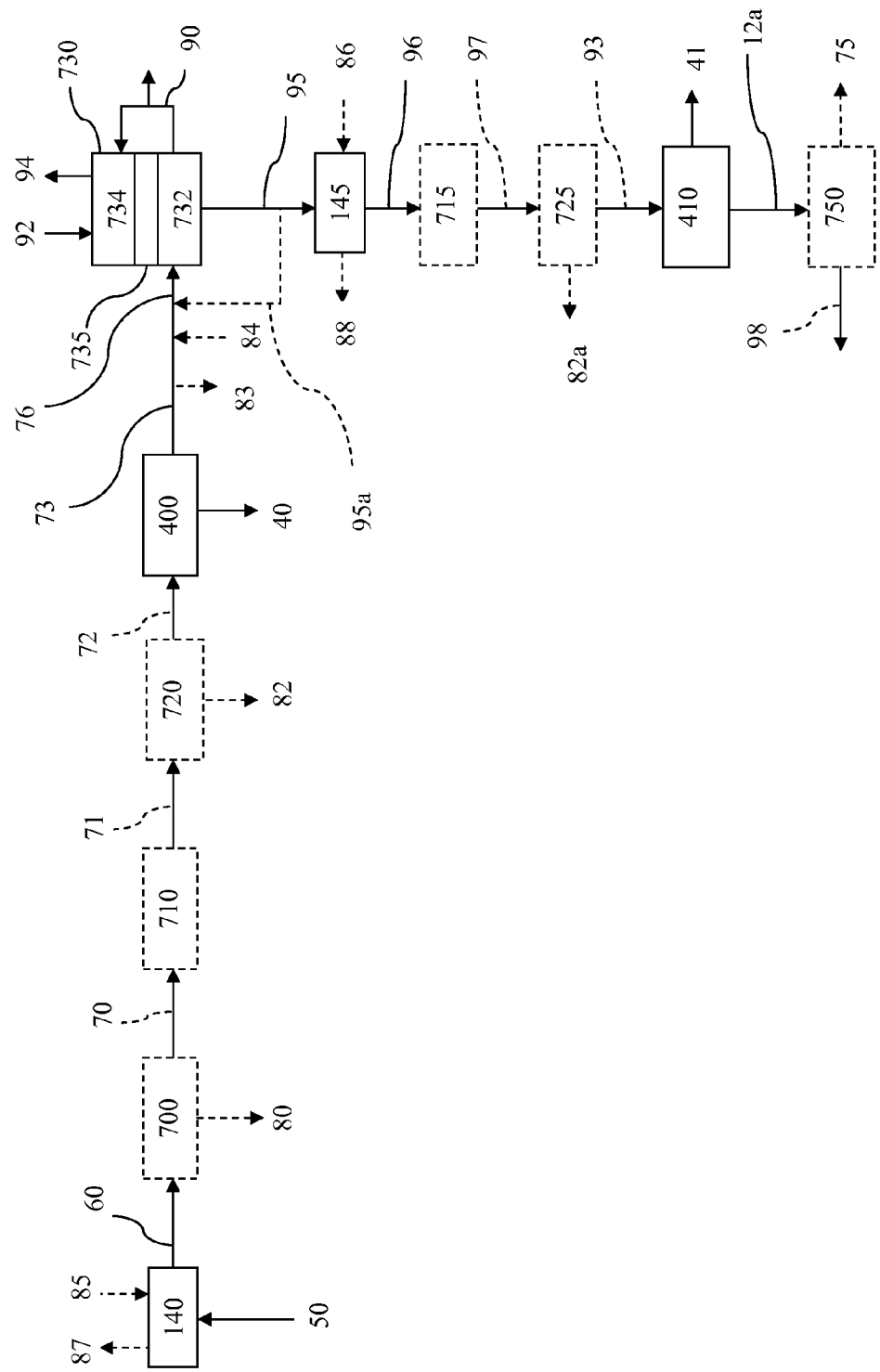
FIG. 2 is a diagram of an embodiment of the initial gas processing and fuel cell portions of a process in accordance with the present invention.

This temperature is generally higher than suitable for feeding downstream gas processes (including acid gas removal unit (400)), so methane-enriched raw product stream (50) can be, for example, provided to a heat recovery unit, e.g., first heat exchanger unit (140) as shown in FIG. 2. The first heat exchanger unit (140) removes at least a portion of the heat energy from the methane-enriched raw product stream (50) and reduces the temperature of the methane-enriched raw product stream (50) to generate a cooled methane-enriched raw product stream (60) having a temperature less than the methane-enriched raw product stream (50).

The heat energy removed by and recovered in first heat exchanger unit (140) can be used, for example, to generate steam and/or superheat various process streams, as will be recognized by a person of ordinary skill in the art. For example, the heat energy can be used to generate and/or superheat a process steam stream (87) from a boiler feed water or steam feed stream (85). Any steam generated can be used, for example, for internal process requirements and/or to generate electrical power.

Any suitable heat recovery unit known in the art may be used. For example, a steam boiler or any other suitable steam generator (such as a shell/tube heat exchanger) that can utilize the recovered heat energy to generate steam or superheat can be used. The heat exchangers may also function as superheaters for steam streams, so that heat recovery through one of more stages of the process can be used to superheat the steam to a desired temperature and pressure, thus eliminating the need for separate fired superheaters.

While any water source can be used to generate steam, the water commonly used in known boiler systems is purified and deionized (about 0.3-1.0 μS/cm) so that corrosive processes are slowed.

In one embodiment, first heat exchanger unit (140) has both a steam boiler section preceded by a superheating section. A stream of boiler feed water can be passed through the steam boiler section to generate a process steam stream, which is then passed through the superheating section to generate a superheated process steam stream of a suitable temperature and pressure for introduction into hydromethanation reactor (200).

The resulting cooled methane-enriched raw product stream (60) will typically exit first heat exchanger unit (140) at a temperature ranging from about 450° F. (about 232° C.) to about 1100° F. (about 593° C.), more typically from about 550° F. (about 288° C.) to about 950° F. (about 510° C.), a pressure of from about 50 psig (about 446 kPa) to about 800 psig (about 5617 kPa), more typically from about 400 psig (about 2860 kPa) to about 600 psig (about 4238 kPa), and a velocity of from about 0.5 ft/sec (about 0.15 m/sec) to about 2.0 ft/sec (about 0.61 m/sec), more typically from about 1.0 ft/sec (0.30 m/sec) to about 1.5 ft/sec (about 0.46 m/sec).

Gas Treatment Prior to Acid Gas Removal (400)

Processing options prior to acid gas removal typically include, for example, one or more of contaminant removal (700), sour shift (710) (water gas shift) and dehydration (720). While these intermediate processing steps can occur in any order, dehydration (720) will usually occur just prior to acid gas removal (last in the series), as a substantial portion of any water in cooled methane-enriched raw product stream (60) may desirably be removed prior to certain types of treatment in acid gas removal unit (200), as discussed below.

Contaminant Removal (700)

As is familiar to those of ordinary skilled in the relevant art, the contamination levels of cooled methane-enriched raw product stream (60) will depend on the nature of the carbonaceous feedstock and the hydromethanation conditions. For example, petcoke and certain coals can have high sulfur contents, leading to higher $H_2S$ and/or COS contamination. Certain coals can contain significant levels of mercury which can be volatilized during the synthesis gas generation. Other feedstocks can be high in nitrogen content, leading to ammonia and/or cyanides.

Some of these contaminants are typically removed in first acid gas removal unit (400), such as $H_2S$ and COS, as discussed below. Others such as ammonia and mercury typically require prior to first acid gas removal unit (400) or fuel cell (730).

When present, contaminant removal of a particular contaminant should remove at least a substantial portion (or substantially all) of that contaminant from the so-treated cleaned gas stream (70), typically to levels at or lower than the specification limits for the desired type of acid gas removal, or the desired type of fuel cell.

Contaminant removal process are in a general sense well know to those of ordinary skill in the relevant art, as exemplified in many of the previously-incorporated references.

For example, ammonia can be removed by water scrubbing the cooled methane-enriched raw product stream (60) directly from first heat exchanger unit (400), or after treatment in one or more sour shift units (710), to generate a scrubber water stream (80). Ammonia can be recovered from the scrubber water stream (80) according to methods known to those skilled in the art, and can typically be recovered as an aqueous solution (e.g., 20 wt %). The waste scrubber water can be forwarded to a waste water treatment unit (not depicted).

Sour Shift (710)

In certain embodiments, particularly where cooled methane-enriched raw product stream (60) contains appreciable amounts of carbon monoxide, and it is desired to maximize hydrogen and/or carbon dioxide production, all or a part of such stream (or cleaned gas stream (70) if present) can be supplied to a sour shift reactor (710).

In sour shift reactor (710), the gases undergo a sour shift reaction (also known as a water-gas shift reaction, see formula (II) above) in the presence of an aqueous medium (such as steam) to convert at least a predominant portion (or a substantial portion, or substantially all) of the CO to $CO_2$, which also increases the fraction of $H_2$ in order to produce a hydrogen-enriched gas stream (71).

A sour shift process is described in detail, for example, in U.S. Pat. No. 7,074,373. The process involves adding water, or using water contained in the gas, and reacting the resulting water-gas mixture adiabatically over a steam reforming catalyst. Typical steam reforming catalysts include one or more Group VIII metals on a heat-resistant support.

Methods and reactors for performing the sour gas shift reaction on a CO-containing gas stream are well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina. Suitable methods for the sour shift process are described in previously incorporated US2009/0246120A1.

The sour shift reaction is exothermic, so it is often carried out with a heat exchanger (not depicted) to permit the efficient use of heat energy. Shift reactors employing these features are well known to those of skill in the art. Recovered heat energy can be used, for example, to generate steam, superheat various process streams and/or preheat boiler feed water for use in other steam generating operations. An example of a suitable shift reactor is illustrated in previously incorporated U.S. Pat. No. 7,074,373, although other designs known to those of skill in the art are also effective.

If sour shift is present and it is desired to retain some carbon monoxide content, a portion of the stream can be split off to bypass sour shift reactor (710) and be combined with hydrogen-enriched gas stream (71) at some point prior to first acid gas removal unit (400).

Dehydration (720)

In addition, prior to first acid gas removal unit (400), the cooled methane-enriched raw product stream (60) can be treated to reduce residual water content via a dehydration unit (720) to produce a dehydrated gas stream (72).

If the first acid gas removal unit (400) is a solid absorber-based system (as described below), it may be desirable to retain some water content for the subsequent fuel cell processing.

If, however, the first acid gas removal unit (400) is a liquid solvent-based system (as described below), then it may be necessary to remove a substantial portion of the water content from cooled methane-enriched raw product stream (60) (or cleaned gas stream (70) or hydrogen-enriched gas stream (71), if present).

Examples of suitable dehydration units include a knock-out drum or similar water separation device, and/or water absorption processes such as glycol treatment.

Such dehydration units and processes again are in a general sense well known to those of ordinary skill in the relevant art.

A resulting sour waste water stream (82) can be sent to a wastewater treatment unit (not depicted) for further processing.

First Acid Gas Removal Unit (400)

As indicated previous, prior to fuel cell (730) at least a substantial portion of the sulfur content (predominantly in the form of hydrogen sulfide) should be removed from the gas stream (such as cooled methane-enriched raw product stream (60), or cleaned gas stream (70), or hydrogen-enriched gas stream (71), or dehydrated gas stream (72)) to generate a sulfur-depleted raw product stream (73). Optionally, at least a predominant portion (or a substantial portion) of the carbon dioxide content may also be removed.

Acid gas removal processes typically involve contacting a gas stream with a liquid solvent or solid absorbent. Such systems are in a general sense well known to those of ordinary skill in the relevant art.

At least a substantial portion (or substantially all) of the $H_2S$, and optionally at least a predominant portion (or a substantial portion, or substantially all) of the $CO_2$ should be removed via the acid gas removal processes. "Substantial" removal in the context of acid gas removal means removal of a high enough percentage of the component such that a desired end product can be generated. The actual amounts of removal may thus vary from component to component.

Typically, at least about 95%, or at least about 98%, or at least about 99.5%, of the $H_2S$, present in the stream fed to first acid gas removal unit (400) (such as cooled methane-enriched raw product stream (60)) should be removed. Preferably, only trace amounts (at most) of $H_2S$ should be present after first acid gas removal unit (400).

When carbon dioxide is also removed, typically at least about 85%, or at least about 90%, or at least about 92%, of the $CO_2$ present in the stream fed to first acid gas removal unit (400) (such as cooled methane-enriched raw product stream (60)) should be removed.

Losses of desired methane and hydrogen in the acid gas removal step should be minimized such that the sulfur-depleted raw product stream (73) comprises at least a substantial portion (and substantially all) of the methane and hydrogen from the stream fed to first acid gas removal unit (400) (such as cooled methane-enriched raw product stream (60)). Typically, such losses should be about 2 mol % or less, or about 1.5 mol % or less, or about 1 mol % of less, of the methane and hydrogen from the stream fed to first acid gas removal unit (400) (such as cooled methane-enriched raw product stream (60)).

Any recovered $H_2S$ from the acid gas removal (and other processes such as sour water stripping) can be converted to elemental sulfur by any method known to those skilled in the art, including the Claus process. Sulfur can be recovered as a molten liquid.

Any recovered $CO_2$ from the acid gas removal can be compressed for transport in $CO_2$ pipelines, industrial use, and/or sequestration for storage or other processes such as enhanced oil recovery.

When only the sulfur content is being removed, the acid gas removal process will typical utilize a solid absorbent, such as a well-known metal oxide and hydroxide based systems (such as zinc oxide sulfur guard beds).

Such solid sulfur absorber systems are in a general sense well-know to those of ordinary skill in the relevant art, and commercially available from a number of vendors such as, for example, UOP LLC.

When it is desired to perform a more comprehensive acid gas treatment to remove carbon dioxide as well, liquid solvents such as monoethanolamine, diethanolamine, methyldiethanolamine, diisopropylamine, diglycolamine, a solution of sodium salts of amino acids, methanol, hot potassium carbonate or the like can be used to generate $CO_2$ and/or $H_25$ laden absorbers. One method can involve the use of Selexol® (UOP LLC, Des Plaines, Ill. USA) or Rectisol® (Lurgi AG, Frankfurt am Main, Germany) solvent having two trains; each train containing an $H_2S$ absorber and a $CO_2$ absorber.

Another liquid solvent based system for removing acid gases is described in previously incorporated US2009/0220406A1.

Spent absorber (40) from first acid gas removal unit (400) can be regenerated and the sulfur content (and optional $CO_2$ content) recovered by processes well-known to those of ordinary skill in the relevant art.

Fuel Cell (730)

As indicated previously, fuel cell (730) comprises an anode section (732) and a cathode section (734) separated by an electrolyte (735). Fuel cell types and configurations for utilizing a mixed hydrogen/methane fuel gas for the anode section (732) and an oxygen-containing gas stream for the cathode section (734) are in a general sense known to those of ordinary skill in the relevant art, and are commercially available, for example, from NexTech Materials, Ltd. (Lewis Center, Ohio USA), Versa Power Systems (Littleton, Colo. USA), Fuel Cell Energy, Inc. (Danbury, Conn. USA) and Staxera GmbH (Dresden, Germany).

One example of a suitable fuel cell is a solid oxide fuel cell where the electrolyte (735) is a solid oxide material, such as an yttria stabilized zirconia, a gadolinium doped ceria or other well-known ceramic membrane material.

Typical fuel cell construction configurations include, for example, planar fuel cells where the anode section (732), electrolyte (735) and cathode section (734) are stacked together as a layer, with multiple layers being interconnected in series to result in a "solid oxide fuel cell stack" of sufficient layers to produce a desired amount of current. Other constructions include tubular geometries, as well as hybrids of the two.

Fuel cell (730) can be operated at atmospheric or elevated pressures, although elevated pressure operation is more typical. To the extent necessary, sulfur-depleted raw product stream (73) can be passed through an expander (770) to reduce the stream pressure as required for optimal fuel cell operation.

Operating temperatures of solid oxide fuel cells must be high enough to result in the reduction of oxygen to ions in the cathode section (734). Typically, that requires a fuel cell operating temperature of at least about 500° C., and more typically from about 600° C. to about 1000° C. or to about 850° C. Lower operating temperatures may be achievable with the use of catalysts.

Figure 3:
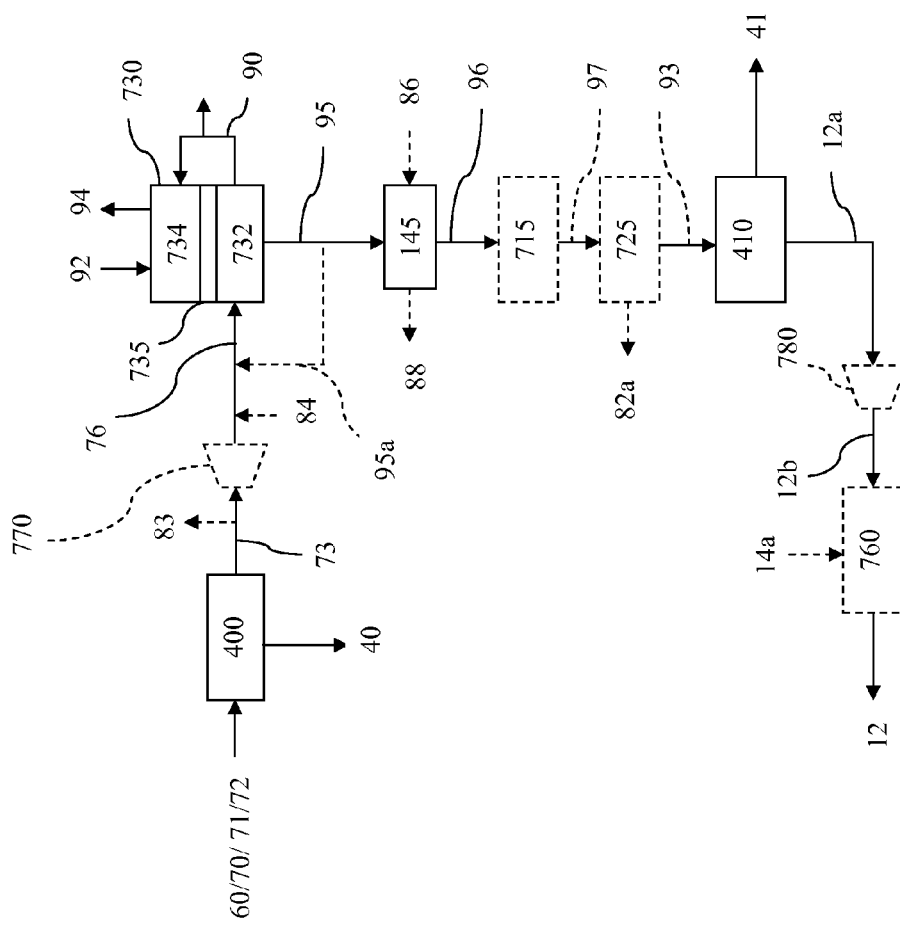
FIG. 3 is a diagram of a first embodiment of the fuel cell and cathode exhaust gas processing portions of a process in accordance with the present invention.
Figure 4:
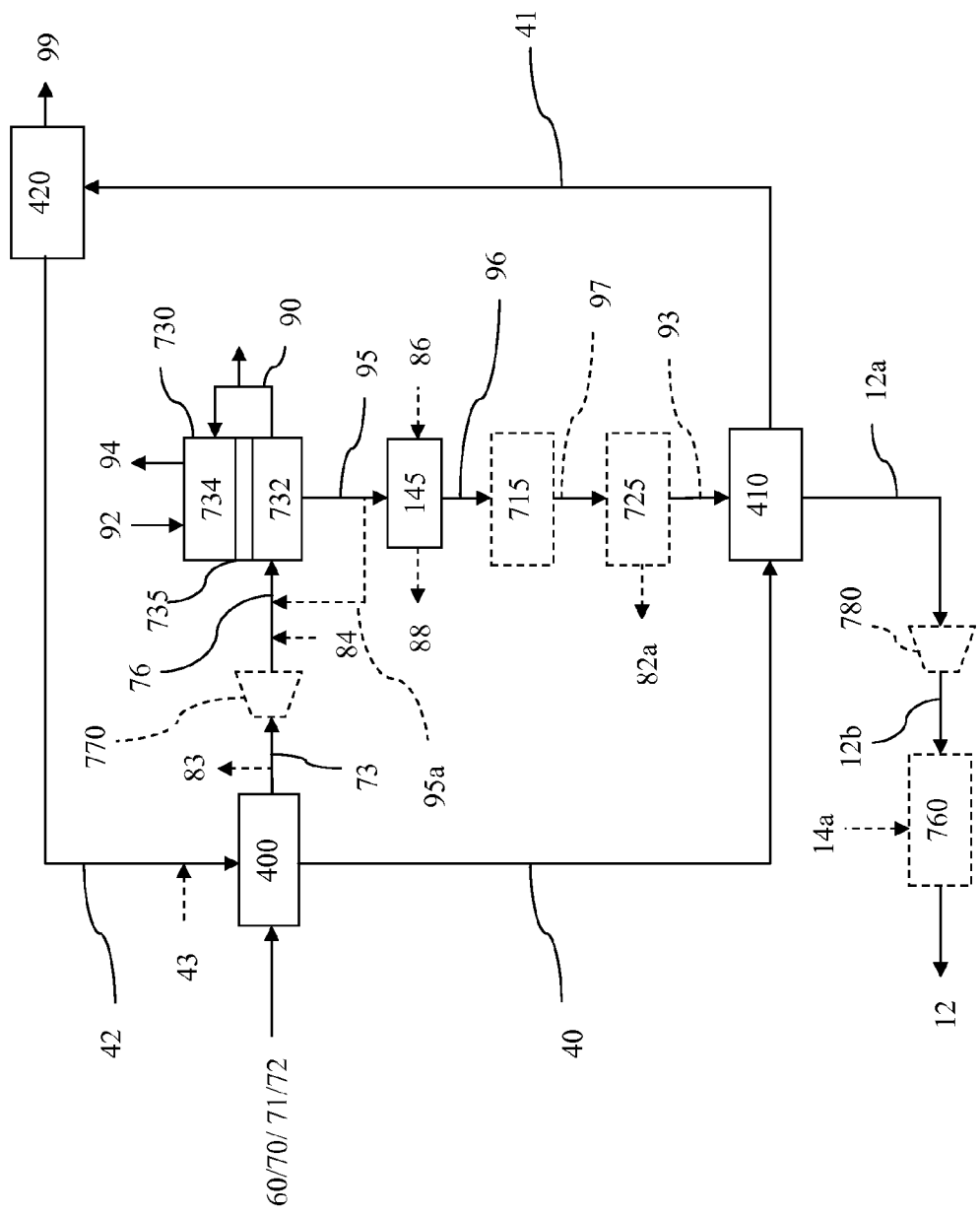
FIG. 4 is a diagram of a second embodiment of the fuel cell and cathode exhaust gas processing portions of a process in accordance with the present invention.

In order to maintain the operating temperatures within fuel cell (730), it may be necessary to preheat one or both the feed streams. As shown in FIGS. 2-4, the fuel mixture fed to anode section (732) may be heated by combination with a recycle stream (95a) from anode exhaust stream (95), which exits the anode section (732) of fuel cell (730) at or near the operating temperature of fuel cell (730).

Figure 5:
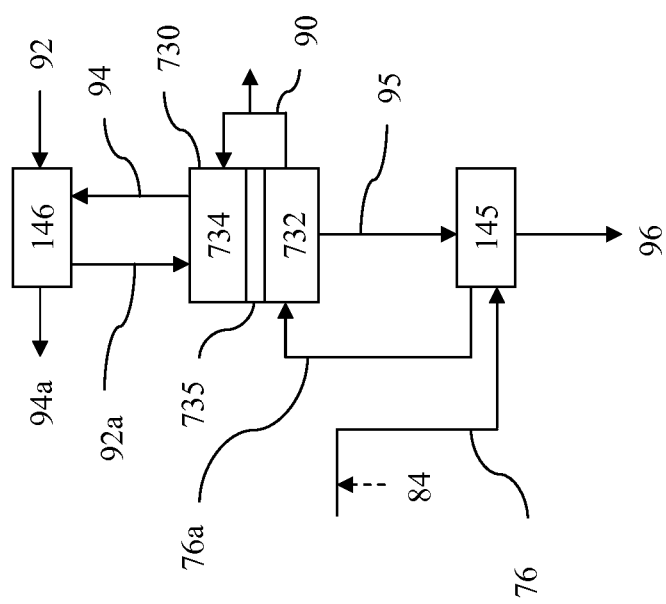
FIG. 5 is a diagram of an embodiment of the fuel cell portion of a process in accordance with the present invention.

In another configuration as shown in FIG. 5, heat energy is removed from cathode exhaust stream (94) via heat exchanger (146) to generate a cooled cathode exhaust stream (94a). Concurrently, air stream (92) is passed through heat exchanger (146) to generate a preheated air stream (92a). Additionally or alternatively, heat energy is removed from anode exhaust stream (95) via second heat exchange unit (145) to generate cooled anode exhaust stream (96), and fuel mixture (76) is passed through second heat exchange unit (145) to generate preheated fuel mixture (76a).

Sufficient heat energy should be removed from cathode exhaust stream (95) for subsequent downstream processing as indicated below. In addition or as an alternative to preheating fuel mixture (76), heat energy from cathode exhaust stream can also be utilized to heat or superheat stream (86) (for example, a boiler feed water stream or a steam stream) to generate a heated stream (88).

Post-Fuel Cell Gas Processing

One of the post-fuel cell processing steps is an acid gas removal step (in a second acid gas removal unit (410)) to remove at least a substantial portion of the carbon dioxide content from the cooled anode exhaust stream (96) to generate a carbon dioxide-depleted anode exhaust stream (12a).

Between the second heat exchange unit (145) and the second acid gas removal unit (410), the cooled anode exhaust stream (96) may optionally be treated in one or more other processing units, for example, a second sour shift unit (715) and/or a second dehydration unit (725) as discussed in further detail below.

Shift Reactor (715)

In certain embodiments, particularly where cooled anode exhaust stream (96) contains appreciable amounts of carbon monoxide, and it is desired to maximize hydrogen and/or carbon dioxide production, or adjust the hydrogen:carbon monoxide molar ratio, all or a part of such stream can be supplied to a second shift reactor (715).

An example of a suitable shift reactor is a sour shift reactor similar to shift reactor (710) (with optional heat recovery), and reference can be had to the discussion above for further details.

The result of the shift reaction is a hydrogen-enriched anode exhaust stream (97).

Dehydration Unit (725)

In addition, prior to second acid gas removal unit (410), the cooled anode exhaust stream (96) can be treated to reduce residual water content via dehydration unit (725) to produce a dehydrated anode exhaust stream (93). Since second acid gas removal unit will typically be a liquid solvent-based system (as discussed below), this dehydration step will normally be present.

Further details about dehydration unit (725) can be had by reference to the discussion of dehydration unit (720) above.

A resulting wastewater stream (82a) can be sent to a wastewater treatment unit (not depicted) for further processing.

Second Acid Gas Removal Unit (410)

As indicated above, second acid gas removal unit (410)) is utilized to remove at least a substantial portion (or substantially all) of the carbon dioxide content from cooled anode exhaust stream (96) to generate carbon dioxide-depleted anode exhaust stream (12a). Typically, second acid gas removal unit (410) will be based on a solvent removal process as described above.

Carbon dioxide removal from cooled anode exhaust stream (96) (or hydrogen-enriched anode exhaust stream (97) or dehydrated anode exhaust stream (93)) will typically be at least about 85%, or at least about 90%, or at least about 92%.

Losses of desired methane and hydrogen in the acid gas removal step should be minimized such that the carbon dioxide-depleted anode exhaust stream (12a) comprises at least a substantial portion (or substantially all) of the methane and hydrogen from cooled anode exhaust stream (96). Typically, such losses should be about 2 mol % or less, or about 1.5 mol % or less, or about 1 mol % of less, of the methane and hydrogen from cooled anode exhaust stream (96).

Spent absorber (41) from second acid gas removal unit (410) can be regenerated and the $CO_2$ content recovered by processes well-known to those of ordinary skill in the relevant art. Again, any recovered $CO_2$ from the acid gas removal can be compressed for transport in $CO_2$ pipelines, industrial use, and/or sequestration for storage or other processes such as enhanced oil recovery.

Acid Gas Removal and Regeneration Loop

In one embodiment, as set forth in FIG. 4, first acid gas removal unit (400) and second acid gas removal unit (410) are both solvent-based units utilizing a common absorber, and are configured to form a loop along with a common absorber regeneration unit (420).

More specifically, first acid gas removal unit (400) is a solvent-based unit that removes acid gases (e.g., both hydrogen sulfide and carbon dioxide) to generate an acid gas-laden absorber stream (40), which is passed to second acid gas removal unit (410). In second acid gas removal unit (410), additional acid gases are removed (e.g., carbon dioxide), and the resulting spent absorber stream (41) is passed to absorber regeneration unit (420), where a regenerated absorber stream (42) is generated and recycled back to first acid gas removal unit (400) (along with a makeup absorber stream (43) as necessary). The acid gases (99) removed from the spent absorber in absorber regeneration unit (420) can then be further processed as described above.

Further Processing to Superheated Hydromethanation Gas Feed Stream (12)

Hydrogen Separation (750)

When an excess of hydrogen is available in carbon dioxide-depleted anode exhaust stream (12a), it may optionally be separated from the carbon dioxide-depleted anode exhaust stream (12a) in a hydrogen separation unit (750) according to methods known to those skilled in the art, such as cryogenic distillation, the use of molecular sieves, gas separation (e.g., ceramic and/or polymer) membranes, and/or pressure swing adsorption (PSA) techniques. See, for example, previously incorporated US2009/0259080A1.

In one embodiment, a PSA device is utilized for hydrogen separation. PSA technology for separation of hydrogen from gas mixtures containing methane (and optionally carbon monoxide) is in general well-known to those of ordinary skill in the relevant art as disclosed, for example, in U.S. Pat. No. 6,379,645 (and other citations referenced therein). PSA devices are generally commercially available, for example, based on technologies available from Air Products and Chemicals Inc. (Allentown, Pa.), UOP LLC (Des Plaines, Ill.) and others.

In another embodiment, a hydrogen membrane separator can be used followed by a PSA device.

Such separation provides a high-purity hydrogen by-product stream (75) and a (partially) hydrogen-depleted anode exhaust stream (98).

The optional hydrogen by-product stream (75) preferably has a purity of at least about 99 mole %, or at least 99.5 mole %, or at least about 99.9 mole %.

The hydrogen by-product stream (75) can be used, for example, as an energy source and/or as a reactant.

Methane Reformer (760)

Alternatively or in addition to the above, at least a portion (or at least a substantial portion, or substantially all) of carbon dioxide-depleted anode exhaust stream (12a) may be passed through a methane reformer unit (760), such as a partial oxidation reactor, to reform methane content to additional hydrogen and carbon monoxide content, as well as to optionally generate heat energy to superheat the superheated hydromethanation gas feed stream (12).

In one embodiment, methane reformer unit (760) utilizes a gas-fed methane partial oxidation/reforming process, such as non-catalytic gaseous partial oxidation, catalytic authothermal reforming or catalytic stream-methane reforming process. These processes are generally well-known in the relevant art. See, for example, Rice and Mann, "Autothermal Reforming of Natural Gas to Synthesis Gas, Reference: KBR Paper #2031," Sandia National Laboratory Publication No. SAND2007-2331 (2007); and Bogdan, "Reactor Modeling and Process Analysis for Partial Oxidation of Natural Gas", printed by Febodruk, B.V., ISBN: 90-365-2100-9 (2004).

Technologies and reactors potentially suitable for use in conjunction with the present invention are commercially available from Royal Dutch Shell plc, Siemens AG, General Electric Company, Lurgi AG, Haldor Topsoe A/S, Uhde AG, KBR Inc. and others.

In non-catalytic gaseous partial oxidation and autothermal reforming, an oxygen-rich gas stream (14a) is fed into the reactor (760) along with carbon dioxide-depleted anode exhaust stream (12a). Optionally, steam may also be fed into the reactor (760). In steam-methane reforming, steam is fed into the reactor along with carbon dioxide-depleted anode exhaust stream (12a). In some cases, minor amounts of other gases such as carbon dioxide, hydrogen and/or nitrogen may also be fed into reactor (760).

Reaction and other operating conditions, and equipment and configurations, of the various reactors and technologies are in a general sense known to those of ordinary skill in the relevant art, and are not critical to the present invention in its broadest sense.

Prior to methane reformer unit (760), it may be desirable to pressurize carbon dioxide-depleted anode exhaust stream (12a) via compressor (780) to generate a pressurized carbon dioxide-depleted anode exhaust stream (12b) at a pressure, for example, ultimately suitable for feeding superheated hydromethanation feed gas stream (12) to hydromethanation reactor (200).

To the extent necessary, superheated hydromethanation feed gas stream (12) can be further superheated subsequent to methane reformer unit (760) and prior to hydromethanation reactor (200) via addition of superheated steam stream (16), and/or by use of a separate superheater (not depicted) that can, for example, be fueled directly by a portion of carbon dioxide-depleted anode exhaust stream (12a), a separate natural gas stream, and/or by a portion of carbonaceous material (10).

Waste Water Treatment

Residual contaminants in waste water resulting from any one or more of the trace contaminant removal, sour shift, ammonia removal, acid gas removal and/or catalyst recovery processes can be removed in a waste water treatment unit to allow recycling of the recovered water within the plant and/or disposal of the water from the plant process according to any methods known to those skilled in the art. Depending on the feedstock and reaction conditions, such residual contaminants can comprise, for example, phenols, CO, $CO_2$, $H_2S$, COS, HCN, ammonia, and mercury. For example, $H_2S$ and HCN can be removed by acidification of the waste water to a pH of about 3, treating the acidic waste water with an inert gas in a stripping column, and increasing the pH to about 10 and treating the waste water a second time with an inert gas to remove ammonia (see U.S. Pat. No. 5,236,557). $H_2S$ can be removed by treating the waste water with an oxidant in the presence of residual coke particles to convert the $H_2S$ to insoluble sulfates which may be removed by flotation or filtration (see U.S. Pat. No. 4,478,425). Phenols can be removed by contacting the waste water with a carbonaceous char containing mono- and divalent basic inorganic compounds (e.g., the solid char product or the depleted char after catalyst recovery, supra) and adjusting the pH (see U.S. Pat. No. 4,113,615). Phenols can also be removed by extraction with an organic solvent followed by treatment of the waste water in a stripping column (see U.S. Pat. Nos. 3,972,693, 4,025,423 and 4,162,902).

Multi-Train Processes

In the processes of the invention, each process may be performed in one or more processing units. For example, one or more hydromethanation reactors may be supplied with the carbonaceous feedstock from one or more catalyst loading and/or feedstock preparation unit operations. Similarly, the methane-enriched raw product streams generated by one or more hydromethanation reactors may be processed or purified separately or via their combination at a heat exchanger, acid gas removal unit and/or fuel cell depending on the particular system configuration, as discussed, for example, in previously incorporated US2009/0324458A1, US2009/0324459A1, US2009/0324460A1, US2009/0324461A1 and US2009/0324462A1. In addition, the one or more hydromethanation reactors may ultimately feed one or more fuel cell assemblies.

In certain embodiments, the processes utilize two or more hydromethanation reactors (e.g., 2-4 hydromethanation reactors). In such embodiments, the processes may contain divergent processing units (i.e., less than the total number of hydromethanation reactors) prior to the hydromethanation reactors for ultimately providing the catalyzed carbonaceous feedstock to the plurality of hydromethanation reactors, and/or convergent processing units (i.e., less than the total number of hydromethanation reactors) following the hydromethanation reactors for processing the plurality of methane-enriched raw product streams generated by the plurality of hydromethanation reactors.

In certain embodiments, the processes utilize two or more fuel cell assemblies. In such embodiments, the processes may contain divergent processing units (i.e., less than the total number of fuel cell assemblies) prior to the fuel cell assemblies for ultimately providing the fuel mixture to the plurality of fuel cell assemblies, and/or convergent processing units (i.e., less than the total number of fuel cell assemblies) following the fuel cell assemblies for processing the plurality of anode exhaust streams generated by the plurality of fuel cell assemblies.

When the systems contain convergent processing units, each of the convergent processing units can be selected to have a capacity to accept greater than a 1/n portion of the total feed stream to the convergent processing units, where n is the number of convergent processing units. For example, in a process utilizing 4 hydromethanation reactors and 2 heat exchangers for accepting the 4 methane-enriched raw product streams from the hydromethanation reactors, the heat exchangers can be selected to have a capacity to accept greater than ½ of the total gas volume (e.g., ½ to ¾) of the 4 gas streams and be in communication with two or more of the hydromethanation reactors to allow for routine maintenance of the one or more of the heat exchangers without the need to shut down the entire processing system.

Similarly, when the systems contain divergent processing units, each of the divergent processing units can be selected to have a capacity to accept greater than a 1/m portion of the total feed stream supplying the convergent processing units, where m is the number of divergent processing units. For example, in a process utilizing 2 catalyst loading units and a single carbonaceous material processing unit for providing the carbonaceous particulate to the catalyst loading units, the catalyst loading units, each in communication with the carbonaceous material processing unit, can be selected to have a capacity to accept ½ to all of the total volume of carbonaceous particulate from the single carbonaceous material processing unit to allow for routine maintenance of one of the catalyst loading units without the need to shut down the entire processing system.

Examples of Specific Embodiments

A specific embodiment of the process is one in which the process is a continuous process, in which steps (a), (b), (c), (d), (e), (f), (g), (h), (i), (j) and, when present, (k) are operated in a continuous manner.

In another specific embodiment, step (k) is present. In a more specific embodiment, in step (k) at least a portion of the carbon dioxide-depleted anode exhaust stream is passed through a methane reformer unit to generate hydrogen and carbon monoxide from methane in the carbon dioxide-depleted anode exhaust stream. Additionally, in another embodiment, the methane reformer unit utilizes non-catalytic partial oxidation process or an autothermal reforming process, and wherein an oxygen-rich gas stream is fed into the methane reformer unit along with the carbon dioxide-depleted anode exhaust stream.

Another specific embodiment is one in which oxygen-rich gas stream (14) is supplied periodically or continuously to hydromethanation reactor (200), and the amount of oxygen provided is varied as a process control, for example, to assist control of the temperature in the hydromethanation reactor. As oxygen is supplied to the hydromethanation reactor, carbon from the feedstock (for example in the by-product char) is partially oxidized/combusted to generate heat energy (as well as typically some amounts of carbon monoxide and hydrogen). The amount of oxygen supplied to the hydromethanation reactor can be increased or decreased to increase the amount of carbon being consumed and, consequently, the amount of heat energy being generated, in situ in the hydromethanation reactor. In such a case, this heat energy generated in situ reduces the heat demand of the reaction in step (b), and thus the amount of heat energy supplied in the superheated hydromethanation gas feed stream (12).

Another specific embodiment is one in which a char by-product is generated in step (b), wherein the char by-product is periodically or continuously withdrawn from hydromethanation reactor (200), and at least a portion of the withdrawn by-product char is provided to a catalyst recovery operation. Recovered catalyst is then recycled and combined with makeup catalyst to meet the demands of the hydromethanation reaction.

Another specific embodiment is one in which a char by-product is generated in step (b), the hydromethanation reactor comprises a collection zone where the char by-product collects, oxygen-rich gas stream (14) is supplied to hydromethanation reactor (200), and oxygen-rich gas stream (14) is introduced into the char by-product collection zone of hydromethanation reactor (200). As the by-product char comprises carbon content from the carbonaceous feedstock, the char carbon is desirably preferentially consumed to generate heat energy (and typically some amounts of carbon monoxide and hydrogen).

In another specific embodiment, hydrogen and carbon monoxide are generated from methane in carbon dioxide-depleted anode exhaust stream (12*a*). In one embodiment, carbon dioxide-depleted anode exhaust stream (12*a*) is fed to methane reformer (760), such as a partial oxidation reactor along with oxygen-rich stream (14*a*), and partially oxidized to hydrogen, carbon monoxide and heat energy.

In another specific embodiment, in step (e) a substantial portion of the hydrogen sulfide and at least a predominant portion of the carbon dioxide are removed from the methane-enriched raw product stream in a first acid gas removal unit to produce the sulfur-depleted raw product stream, and in step (j) at least a substantial portion of the carbon dioxide is removed from the cooled anode exhaust stream in a second acid gas removal unit to generate a carbon dioxide-depleted anode exhaust stream. In a more specific embodiment, the first acid gas removal unit and the second acid gas removal unit utilize a common absorber. In another more specific embodiment, the first acid gas removal unit and the second acid gas removal unit form a loop along with a common absorber regeneration unit.

In another specific embodiment, at least a portion of the heat energy is recovered from the oxygen-depleted cathode exhaust stream, and at least a portion of the heat energy recovered from the oxygen-depleted cathode exhaust stream is used to preheat the oxygen-containing gas stream.

In another specific embodiment, at least a portion of the heat energy recovered from the anode exhaust stream is used to preheat the fuel mixture.

In another specific embodiment, the superheated hydromethanation feed gas stream is further superheated subsequent prior to the hydromethanation reactor via addition of a superheated steam stream, and/or by use of a separate superheater fueled directly by a portion of carbon dioxide-depleted anode exhaust stream.

We claim:

1. A process for generating electrical power from a non-gaseous carbonaceous material, the process comprising the steps of:
   (a) introducing into a hydromethanation reactor (1) a carbonaceous feedstock derived from the non-gaseous carbonaceous material, (2) a hydromethanation catalyst, and (3) a superheated hydromethanation gas feed stream comprising steam, hydrogen and carbon monoxide;
   (b) reacting the carbonaceous feedstock in the hydromethanation reactor in the presence of carbon monoxide, hydrogen, steam and hydromethanation catalyst to produce a methane-enriched raw product;
   (c) withdrawing a methane-enriched product stream from the hydromethanation reactor, wherein the methane-enriched raw product stream comprises methane, carbon monoxide, hydrogen, carbon dioxide, hydrogen sulfide, steam and heat energy, and wherein the methane-enriched raw product stream comprises at least 50 mol % methane plus carbon dioxide (based on the moles of methane, carbon dioxide, carbon monoxide and hydrogen in the methane-enriched raw product stream);
   (d) recovering a portion of the heat energy from the methane-enriched raw product stream;
   (e) removing a substantial portion of the hydrogen sulfide and, optionally, at least a predominant portion of the carbon dioxide, from the methane-enriched raw product stream to produce a sulfur-depleted raw product stream;
   (f) introducing into a fuel cell (1) an oxygen-containing gas stream and (2) a fuel mixture, the fuel cell comprising an anode section and a cathode section separated by an electrolyte section, the oxygen-containing gas stream being introduced into the cathode section and the fuel mixture being introduced into the anode section, the fuel mixture comprising at least methane and hydrogen from the sulfur-depleted raw product stream;
   (g) electrochemically reacting in the fuel cell oxygen from the oxygen-containing gas stream with the fuel mixture to generate electrical power and heat energy;
   (h) withdrawing from the fuel cell (1) an oxygen-depleted cathode exhaust stream and (2) an anode exhaust stream, wherein both the oxygen-depleted cathode exhaust stream and the anode exhaust stream comprise heat energy, and wherein the anode exhaust stream further comprises methane, hydrogen, carbon monoxide, carbon dioxide and steam;
   (i) recovering a portion of the heat energy from the anode exhaust stream to produce a cooled anode exhaust stream;
   (j) removing at least a substantial portion of the carbon dioxide from the cooled anode exhaust stream to generate a carbon dioxide-depleted anode exhaust stream; and
   (k) optionally generating carbon monoxide and hydrogen from at least a portion of the methane in the carbon-dioxide depleted anode exhaust stream;
   wherein the hydrogen and carbon monoxide in the superheated hydromethanation gas feed stream substantially comprises (1) hydrogen and carbon monoxide from the carbon dioxide-depleted anode exhaust stream, and (2) hydrogen and carbon monoxide generated from methane in the carbon dioxide-depleted anode exhaust stream.

2. The process of claim 1, wherein the methane-enriched raw product stream comprises at least about 20 mol % methane (based on the moles of methane, carbon dioxide, carbon monoxide and hydrogen in the methane-enriched raw product stream).

3. The process of claim 1, wherein the carbonaceous feedstock is loaded with hydromethanation catalyst prior to being supplied to the hydromethanation reactor, and the hydromethanation catalyst comprises an alkali metal.

4. The process of claim 1, wherein a char by-product is generated in step (b), and is continuously or periodically withdrawn from the hydromethanation reactor.

5. The process of claim 4, wherein the hydromethanation catalyst comprises an alkali metal, the char by-product comprises an alkali metal content from the hydromethanation catalyst, at least a portion of the char by-product is treated to recover at least a portion of the alkali metal content, and at least a portion of the recovered alkali metal content is recycled for use as hydromethanation catalyst.

6. The process of claim 5, wherein the carbonaceous feedstock is impregnated with hydromethanation catalyst prior to being supplied to the hydromethanation reactor, and the hydromethanation catalyst used to impregnate the second carbonaceous feedstock comprises recycled hydromethanation catalyst and a make-up hydromethanation catalyst.

7. The process of claim 1, wherein an oxygen-rich gas stream is fed into the hydromethanation reactor.

8. The process of claim 7, wherein the amount of oxygen provided is varied as a process control to assist control of the temperature in the hydromethanation reactor.

9. The process of claim 1, wherein step (k) is present.

10. The process of claim 9, wherein step (k) comprises the step of passing at least a portion of the carbon dioxide-depleted anode exhaust stream through a methane reformer unit to generate hydrogen and carbon monoxide from methane in the carbon dioxide-depleted anode exhaust stream.

11. The process of claim 10, wherein the methane reformer unit utilizes non-catalytic partial oxidation process or an autothermal reforming process, and wherein an oxygen-rich gas stream is fed into the methane reformer unit along with the carbon dioxide-depleted anode exhaust stream.

12. The process of claim 1, wherein step (b) has a syngas demand, a steam demand and a heat demand, and the superheated hydromethanation gas feed stream comprises hydrogen, carbon monoxide, steam and heat energy sufficient to at least substantially satisfy the syngas demand, steam demand and heat demand.

13. The process of claim 1, wherein in step (e) a substantial portion of the hydrogen sulfide and at least a predominant portion of the carbon dioxide are removed from the methane-enriched raw product stream in a first acid gas removal unit to produce the sulfur-depleted raw product stream, and in step (j) at least a substantial portion of the carbon dioxide is removed from the cooled anode exhaust stream in a second acid gas removal unit to generate a carbon dioxide-depleted anode exhaust stream.

14. The process of claim 1, wherein at least a portion of the heat energy is recovered from the oxygen-depleted cathode exhaust stream, and at least a portion of the heat energy recovered from the oxygen-depleted cathode exhaust stream is used to preheat the oxygen-containing gas stream.

15. The process of claim 1, wherein at least a portion of the heat energy recovered from the anode exhaust stream is used to preheat the fuel mixture.

* * * * *